US011050725B2

(12) United States Patent
Becher et al.

(10) Patent No.: US 11,050,725 B2
(45) Date of Patent: Jun. 29, 2021

(54) PRIVATE BENCHMARKING CLOUD SERVICE WITH ENHANCED STATISTICS

(71) Applicant: SAP SE, Walldorf (DE)

(72) Inventors: Kilian Becher, Dresden (DE); Arne Schramm, Dresden (DE); Axel Schroepfer, Borthen (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 16/036,288

(22) Filed: Jul. 16, 2018

(65) Prior Publication Data

US 2020/0021568 A1   Jan. 16, 2020

(51) Int. Cl.
| | |
|---|---|
| *H04L 29/06* | (2006.01) |
| *H04L 9/32* | (2006.01) |
| *H04L 9/00* | (2006.01) |
| *H04L 9/08* | (2006.01) |
| *G06F 21/62* | (2013.01) |
| *G06F 21/60* | (2013.01) |

(Continued)

(52) U.S. Cl.
CPC ........ *H04L 63/0478* (2013.01); *G06F 21/602* (2013.01); *G06F 21/6263* (2013.01); *H04L 9/008* (2013.01); *H04L 9/083* (2013.01); *H04L 9/085* (2013.01); *H04L 9/3242* (2013.01); *A63F 13/847* (2014.09); *G06F 16/22* (2019.01); *G06F 16/2462* (2019.01)

(58) Field of Classification Search
CPC .... H04L 9/008; H04L 9/3242; H04L 63/0478
USPC ....................................................... 713/155
See application file for complete search history.

(56) References Cited

U.S. PATENT DOCUMENTS

| | | |
|---|---|---|
| 2005/0033631 A1 | 2/2005 | Wefers et al. |
| 2011/0218919 A1* | 9/2011 | Geiger ............. A61B 1/00 705/50 |

(Continued)

OTHER PUBLICATIONS

Michael Armbrust et al., A View of Cloud Computing, Communications of the ACM. Apr. 2010, vol. 53, No. 4, pp. 50-58.

(Continued)

*Primary Examiner* — Teshome Hailu
(74) *Attorney, Agent, or Firm* — Fountainhead Law Group P.C.

(57) ABSTRACT

Embodiments allow comparison of key figures (e.g., costs, lead times) between different entities in a privacy-preserving manner, utilizing secure multi-party computation (MPC) approaches implemented by a central service provider. The central service provider receives encrypted key figure data from each of multiple players in a peer group. In one embodiment the central service provider executes a secure computation protocol comprising a semi-homomorphic encryption scheme exhibiting an additive homomorphic property. The central service provider returns to each player, a statistical measure (e.g., top quartile, bottom quartile) allowing comparison with the other players' key figures while preserving privacy. Alternative embodiments may return to the players, a statistical measure calculated from a Boolean or arithmetic circuit implemented at the central server using other secure computation approaches (e.g., garbled circuits, secret sharing, or (semi or fully) homomorphic encryption. Embodiments may find value in maintaining privacy of key figure data shared between competitors for benchmarking.

20 Claims, 12 Drawing Sheets

(51) Int. Cl.
  A63F 13/847    (2014.01)
  G06F 16/22     (2019.01)
  G06F 16/2458   (2019.01)

(56) References Cited

U.S. PATENT DOCUMENTS

| | | | | |
|---|---|---|---|---|
| 2013/0321425 A1* | 12/2013 | Greene | ............... | G06T 11/206 345/440 |
| 2016/0036584 A1* | 2/2016 | Nikolaenko | ............ | G09C 1/00 380/28 |
| 2016/0110500 A1* | 4/2016 | Wang | ................... | H04L 9/0637 713/189 |

OTHER PUBLICATIONS

Mikhail Atallah et al., "Private Collaborative Forecasting and Benchmaking," WPES '04, Oct. 28, 2004.
Zvika Brakerski, et al., "(Leveled) Fully Homomorphic Encryption without Bootstrapping," ITCS'12 Proceedings of the 3rd Innovation in Theoretical Computer Science Conference, pp. 309-325. Jan. 2012.
Mihir Bellare, "Foundations of Garbled Circuits," CCS'12, Oct. 16-18, 2012, ACM 978-1-4503-1651, Apr. 12, 2010.
Donald Beaver, et al.,"The Round Complexity of Secure Protocols," 1990, ACM 089791-361-2/90/0005/0503.
Dan Bogdanov, "Sharemind: Programmable Secure Computations with Practical Applications," Institue of Computer Science, Faculty of Mathematics and Computer Science, University of Tartu, Estonia. Dissertation accepted on Jan. 21, 2013.
Keith Bonawitz, et al., "Practical Seure Aggregation for Federated Learning on Usesr-Held Data," 30th Conference on Neural Information Processing System (NIPS 2016, Spain.
Dan Bogdanov et al., "Deploying Secure Multi-party Computation for Financial Data Analysis," This is an extended version of the paper presented at Financial Cryptography and Data Security 2012.
Victor Costan et al., "Intel SGX Explained," Computer Science and Artificial Intelligence Laboratory, MIT, pp. 1-118, 2016.
Ronald Cramer et al., "Multiparty Computation from Threshold Homomorphic Encryption," BRICS, Department of Computer Science, Univerity of Arhus, Denmark. Eurocrypt 2001, LNCS 2045, pp. 280-300, 2001.
Ivan B. Damgard et al., A Generalisation, a Simplification and some Applications of Paillier's Probabilistic Public-Key System, BRICS Report Series, RS-00-45, Dec. 2000.
Shimon Even et al., "A Randomized Protocol for Signing Contracts," Communications of the ACM, Jun. 1985, vol. 28, No. 6.
Craig Gentry, "A Fully Homomorphic Encryption Scheme," Dissertation.Sep. 2009.
Craig Gentry, Fully Homomorphic Encryption Using Ideal Lattices, STOC'09, May 31-Jun. 2, 2009, ACM.
Craig Gentry, "Fully Homomorphic Encryption without Squashing Using Depth-3 Arithmetic Circuits," IBM T.J. Watson Research Center, Sep. 14, 2011.
Oded Goldreich, "How to Play any Mental Game or a Completeness Theorem for Protocols with Honest Majority," ACM, 1987.
Joachim Von Zur Gathen et al., "Boolean Circuits versus Arithmetic Circuits," Information and Commputations 1991.
Juan Garay, et al., "Practical and Secure Solutions for Integer Comparison", Department of Mathematics and Computing Science, The Netherlands, published in 2007.
Yan Huang, "Private Set Intersection: Are Garbled Circuits Better than Custom Protocols?," http:/Might/BeEvil.org. Published 2012.
Martin Hirt, Multi-Party Computation: Efficient Protocols, General Adversaries, and Voting. Dissertation, 2001.
Martin Hirt et al., "Kryptographische Protokolle," Feb. 2009.
Yan Huang et al., "Faster Secure Two-Party Computation Using Garbled Circuits," Usenix Security Symposium 2011.
Florian Kerschbaum, "Practical Privacy-Preserving Benchmarking," Kerschbaum, F. 2008, in IFIP International Federation for Information Processing, vol. 278; Proceedings of the IFIP TC 11 23rd International Information Security Conference. pp. 17-31.
Florian Kerschbaum, "A Privacy-Preserving Benchmarking Platform," Dissertation Jun. 16, 2010.
Vladimir Kolesnikov et al., "Improved Garbled Circuit: Free XOR Gates and Applications." International Coloquium on Automata Languages and Programming. 2008.
Arjen K. Lenstra, "Key Lengths,Contribution to the Handbook of Information Security," 2004.
Prof. Dr. Peter Lory, "Sichere Mehrpartenienberechnunngen und Datenschutzfreundliche Klassifikatioin auf Basis Horizontal Partitionierter Datenbanken," Dissertation Dec. 12, 2012.
Robert Patrick McEvoy, et al.,"Fortuna: Cryptographically Secure Pseudo-Random Number Generation in Software and Hardware," Conference Paper Jul. 2006.
Prof. Dr. G. Nebe, "Gitter und Codes," 2007.
Pascal Paillier, "Public-Key Cryptosystems Based on Composite Degree Residuosity Classes," J. Stern (Ed.): Eurocrypt 1999, LNCS 1592, pp. 223-238.
Benny Pinkas et al., "Secure Two-Party Computation is Practical," 2009.
Benny Pinkas, "Session 3: The GMW and BMR Multi-Party Protocols," Secure Computation and Efficiency Bar-Ilan University, Israel, 2015.
Axel Schroepfer, et al., "Secure Benchmarking in the Cloud," SACMAT'13, Jun. 12-14, 2013, Amsterdam, The Netherlands.
Srikanth Srinivasan, "New Directions in Arithmetic and Boolean Circuit Complexity," thesis submitted to the Board of Studios for Mathematical Sciences. Nov. 6, 2019.
Tiina Turban, "A Secure Multi-Party Computation Protocol Suite Inspired by Shamir's Secret Sharing Scheme," May 2014, Norweigian University of Science and Technology, Dept of Telematics.
Villegas Bautista, "Design of Advanced Primitives for Secure Multiparty Computation: Special Shuffles and Integer Comparison," published Jan. 1, 2010.
Andrew C. Yao, "Protocols for Secure Computations," IEEE 1982.
Andrew C. Yao, "How to Generate and Exchange Secrets," National Science Foundation, IEEE 1986.

* cited by examiner

FIG. 3A
Round 1

1. $P_j \to P_S$: $E(x_j)$

FIG. 3B
Round 2

2. $P_S \to P_j$: $E(sum + r_1) = E\left(\sum_{j=1}^{n} x_j\right) \cdot E(r_1)$ 3. $\quad E\left(\vec{c}_{\phi(j)}\right) = \left(..., E\left(c_{\phi(j)_{\phi(j)}}\right) = E\left(r_{2_j} \cdot (x_{\phi(j)} - x_{\phi'(j)}) + r_{2_j}\right), ...\right)$ 4. $P_S \xrightarrow{OT} P_j$: $E_j^{median} = \begin{cases} E(x_{\phi(j)} + r_{4_j}) & \text{if } pos\left(\vec{c}_{\phi(j)}\right) = \lceil \frac{n}{2} \rceil \\ E(r_{4_j}) & \text{otherwise} \end{cases}$ 5. $\quad E_j^{pic} = \begin{cases} E(x_{\phi(j)} + r_{5_j}) & \text{if } pos\left(\vec{c}_{\phi(j)}\right) \geq \lceil \frac{2 \cdot n}{3} + 1 \rceil \\ E(r_{5_j}) & \text{otherwise} \end{cases}$ 6. $\quad E_j^{max} = \begin{cases} E(x_{\phi(j)} + r_{6_j}) & \text{if } pos\left(\vec{c}_{\phi(j)}\right) = n \\ E(r_{6_j}) & \text{otherwise} \end{cases}$ 6B. $\quad E_j^{bquart} = \begin{cases} E(x_{\phi(j)} + r_{6B_j}) & \text{if } pos\left(\vec{c}_{\phi(j)}\right) = \lceil \frac{n}{4} \rceil \\ E(r_{6B_j}) & \text{otherwise} \end{cases}$ 6C. $\quad E_j^{tquart} = \begin{cases} E(x_{\phi(j)} + r_{6C_j}) & \text{if } pos\left(\vec{c}_{\phi(j)}\right) = \lceil \frac{3 \cdot n}{4} + 1 \rceil \\ E(r_{6C_j}) & \text{otherwise} \end{cases}$ 7. $P_j \to P_S$: $sum + r_1 = D(E(sum + r_1))$ 8. $\quad MAC(sum + r_1 || j, K_{MAC})$ 9. $P_S \to P_j$: $sum = sum + r_1 - r_1$ 10. $P_j \to P_S$: $E_j^{median'} = E_j^{median} \cdot E(0)$ 11. $\quad E_j^{pic'} = E_j^{pic} \cdot E(0)$ 12. $\quad E_j^{max'} = E_j^{max} \cdot E(0)$ 12B. $\quad E_j^{bquart'} = E_j^{bquart} \cdot E(0)$ 12C. $\quad E_j^{tquart'} = E_j^{tquart} \cdot E(0)$ 13. $\quad E\left((x_j - mean)^2\right) = E\left(\left(x_j - \frac{sum}{n}\right)^2\right)$

FIG. 3C

Round 3

14. $P_S \rightarrow P_i$: $E(variance + r_7) = E\left(\sum_{i=1}^{n}(x_i - mean)^2\right) \cdot E(r_7)$
$= \left(\prod_{i=1}^{n} E\left((x_i - mean)^2\right)\right) \cdot E(r_7)$ 15. $E(median + r_8) = \left(\prod_{i=1}^{n} E_j^{median\prime} \cdot E(-r_{8_i})\right) \cdot E(r_8)$ 16. $E(bic + r_9) = \left(\prod_{i=1}^{n} E_j^{bic\prime} \cdot E(-r_{9_i})\right) \cdot E(r_9)$ 17. $E(max + r_{10}) = \left(\prod_{i=1}^{n} E_j^{max\prime} \cdot E(-r_{10_i})\right) \cdot E(r_{10})$ 17B. $E(bquart + r_{10B}) = \left(\prod_{i=1}^{n} E_j^{bquart\prime} \cdot E(-r_{10B_i})\right) \cdot E(r_{10B})$ 17C. $E(tquart + r_{10C}) = \left(\prod_{i=1}^{n} E_j^{tquart\prime} \cdot E(-r_{10C_i})\right) \cdot E(r_{10C})$ 18. $h(MAC(sum + r_1\|1, K_{MAC}), ..., MAC(sum + r_1\|n, K_{MAC}))$ 19. $P_i \rightarrow P_S$: $variance + r_7 = D(E(variance + r_7))$ 20. $MAC(variance + r_7\|i, K_{MAC})$ 21. $median + r_8 = D(E(median + r_8))$ 22. $MAC(median + r_8\|i, K_{MAC})$ 23. $bic + r_9 = D(E(bic + r_9))$ 24. $MAC(bic + r_9\|i, K_{MAC})$ 25. $max + r_{10} = D(E(max + r_{10}))$ 25B. $bquart + r_{10B} = D(E(bquart + r_{10B}))$ 25C. $tquart + r_{10C} = D(E(tquart + r_{10C}))$ 26. $MAC(max + r_{10}\|i, K_{MAC})$ 26B. $MAC(bquart + r_{10B}\|i, K_{MAC})$ 26C. $MAC(tquart + r_{10C}\|i, K_{MAC})$ 27. $P_S \rightarrow P_i$: $variance = variance + r_7 - r_7$ 28. $median = median + r_8 - r_8$ 29. $bic = bic + r_9 - r_9$ 30. $max = max + r_{10} - r_{10}$ 30B. $bquart = bquart + r_{10B} - r_{10B}$ 30C. $tquart = tquart + r_{10C} - r_{10C}$ Round 4

31. $P_S \rightarrow P_i$: $h(MAC(variance + r_7\|1, K_{MAC}), ..., MAC(variance + r_7\|n, K_{MAC}))$ 32. $h(MAC(median + r_8\|1, K_{MAC}), ..., MAC(median + r_8\|n, K_{MAC}))$ 33. $h(MAC(bic + r_9\|1, K_{MAC}), ..., MAC(bic + r_9\|n, K_{MAC}))$ 34. $h(MAC(max + r_{10}\|1, K_{MAC}), ..., MAC(max + r_{10}\|n, K_{MAC}))$ 34B. $h(MAC(bquart + r_{10B}\|1, K_{MAC}), ..., MAC(bquart + r_{10B}\|n, K_{MAC}))$ 34C. $h(MAC(tquart + r_{10C}\|1, K_{MAC}), ..., MAC(tquart + r_{10C}\|n, K_{MAC}))$

| | |
|---|---|
| Cost Item | Casing |
| KPI | Total Cost |
| KPI Value | 4,551.20 — EUR |
| Peer Group | Peergroup 3 |

Successfully completed secure benchmark

| | | |
|---|---|---|
| Average | 1,517.27 | EUR |
| Sum | 4,551.80 | EUR |
| Variance | 4,603,333.33 | EUR |
| Best in Class | 4,551.00 | EUR |
| Median | 0.44 | EUR |
| Maximum | 4,551.00 | EUR |
| Bottom Quartile | 0.15 | EUR |
| Top Quartile | 4,551.00 | EUR |

Start    Cancel

FIG. 9

PRIVATE BENCHMARKING CLOUD SERVICE WITH ENHANCED STATISTICS

BACKGROUND

Unless otherwise indicated herein, the approaches described in this section are not prior art to the claims in this application and are not admitted to be prior art by inclusion in this section.

Collaborative optimization processes may be jointly conducted by at least two independent entities (e.g. business partners), to the benefit of both of them. Collaborative optimization can involve a data comparison or a common calculation of key figures (e.g., lot size of a manufacturing process).

Data comparison can be used for benchmarking analyses. Such benchmarking studies are used by companies to compare characteristics (e.g. productivity) against those of competitors in the same industry. By performing such benchmarking analysis, a company can determine how well it is performing relatively to others.

For both common calculations of key figures and data comparison, maintaining the privacy of the data being supplied, is a crucial concern for the participating entities. A particular entity may be reluctant to share such inputs representing sensitive data (e.g., costs, capacities) that could adversely affect its future bargaining power (e.g., with a partner), or its competitive position (e.g., against a competitor).

SUMMARY

Embodiments allow comparison of key figures (e.g., costs, lead times) between different entities in a privacy-preserving manner together with a central service provider, utilizing secure multi-party computation (MPC) approaches. The central service provider receives encrypted key figure data from each of multiple players in a peer group. In one embodiment the central service provider executes a secure computation protocol comprising a semi homomorphic encryption scheme exhibiting an additive homomorphic property. After rounds of joint computation and communication, central service provider returns to each player, a statistical measure (e.g., top quartile, bottom quartile) allowing comparison with the other the players' key figures while preserving privacy. Alternative embodiments may return to the players, a statistical measure calculated from a Boolean or arithmetic circuit potentially in a decentralized communication scheme using other secure computation approaches (e.g., garbled circuits, secret sharing, or fully homomorphic encryption). Embodiments may find particular value in maintaining privacy of key figure data shared between competitors for benchmarking purposes and computing the statistical measures in a centralized communication scheme where every player communicates only with a single central service provider.

An embodiment of a computer-implemented method comprises a central service provider receiving from a first player, an encrypted first value of a key figure type. The central service provider receives from a second player, an encrypted second value of the key figure type. The central service provider receives from a third player, an encrypted third value of the key figure type, wherein the first player, the second player, and the second player comprise a peer group. The central service provider performs a secure computation protocol on the encrypted first value, the encrypted second value, and the encrypted third value to generate a statistical measure selected from a top quartile and a bottom quartile. The central service provider stores the statistical measure in a database as a data object comprising the key figure type and the peer group. The central service provider communicates the statistical measure to the first player, the second player, and the third player.

A non-transitory computer readable storage medium embodies a computer program for performing a method, said method comprising a central service provider receiving from a first player, an encrypted first value of a key figure type. The central service provider receives from a second player, an encrypted second value of the key figure type. The central service provider receives from a third player, an encrypted third value of the key figure type, wherein the first player, the second player, and the third player comprise a peer group. The central service provider performs a secure computation protocol on the encrypted first value, the encrypted second value, and the encrypted third value to generate a statistical measure selected from a top quartile and a bottom quartile, wherein the secure computation protocol is based upon a semi-homomorphic encryption scheme exhibiting an additive homomorphic property. The central service provider stores the statistical measure in a database as a data object comprising the key figure type and the peer group. The central service provider communicates the statistical measure to the first player, the second player, and the third player.

An embodiment of a computer system comprises one or more processors and a software program, executable on said computer system. The software program is configured to cause a remote in-memory database engine to receive from a first player, an encrypted first value of a key figure type, to receive from a second player, an encrypted second value of the key figure type, and to receive from a third player, an encrypted third value of the key figure type. The first player, the second player, and the third player together comprise a peer group. The software program is further configured to cause the remote in-memory database engine to perform a secure computation protocol on the encrypted first value, the encrypted second value, and the encrypted third value to generate a statistical measure selected from a top quartile and a bottom quartile. The software program is further configured to cause the remote in-memory database engine to store the statistical measure in an in-memory database as a data object comprising the key figure type and the peer group. The software program is further configured to cause the remote in-memory database engine to communicate the statistical measure to the first player, the second player, and the third player.

In certain embodiments the secure computation protocol comprises a semi-homomorphic encryption scheme exhibiting an additive homomorphic property.

According to some embodiments the semi-homomorphic encryption scheme comprises Paillier's encryption.

In various embodiments the central service provider communicates with the first player through an oblivious transfer.

According to specific embodiments the central service provider communicates a hashed Message Authentication Code (MAC) to the first player.

According to particular embodiments the secure computation protocol is performed utilizing a circuit of the central service provider.

In certain embodiments the secure computation protocol utilizes garbled circuits, secret sharing, or fully homomorphic encryption.

In some embodiments the database comprises an in-memory database, and the central service provider comprises an in-memory database engine.

The following detailed description and accompanying drawings provide a better understanding of the nature and advantages of embodiments.

BRIEF DESCRIPTION OF THE DRAWINGS

FIGS. 3A-D show the steps of various rounds of one embodiment of an exemplary privacy-maintaining benchmarking secure computation protocol.

FIG. 4 is a simplified block diagram providing an overview of one example of an embodiment of a secure benchmarking system.

FIG. 7 presents a simplified class diagram of a front end add-in.

FIG. 9 shows an example of a benchmarking view after finishing a protocol execution.

DETAILED DESCRIPTION

Described herein are methods and apparatuses implementing privacy-preserving benchmarking through multi-party computation. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Embodiments allow comparison of key figures (e.g., costs, lead times) between different entities in a privacy-preserving manner together with a central service provider, utilizing secure multi-party computation (MPC) approaches. The central service provider receives encrypted key figure data from each of multiple players in a peer group. In one embodiment the central service provider executes a secure computation protocol comprising a semi homomorphic encryption scheme exhibiting an additive homomorphic property. After rounds of joint computation and communication, central service provider returns to each player, a statistical measure (e.g., top quartile, bottom quartile) allowing comparison with the other the players' key figures while preserving privacy. Alternative embodiments may return to the players, a statistical measure calculated from a Boolean or arithmetic circuit potentially in a decentralized communication scheme using other secure computation approaches (e.g., garbled circuits, secret sharing, or fully homomorphic encryption). Embodiments may find particular value in maintaining privacy of key figure data shared between competitors for benchmarking purposes and computing the statistical measures in a centralized communication scheme where every player communicates only with a single central service provider.

Figure 1:
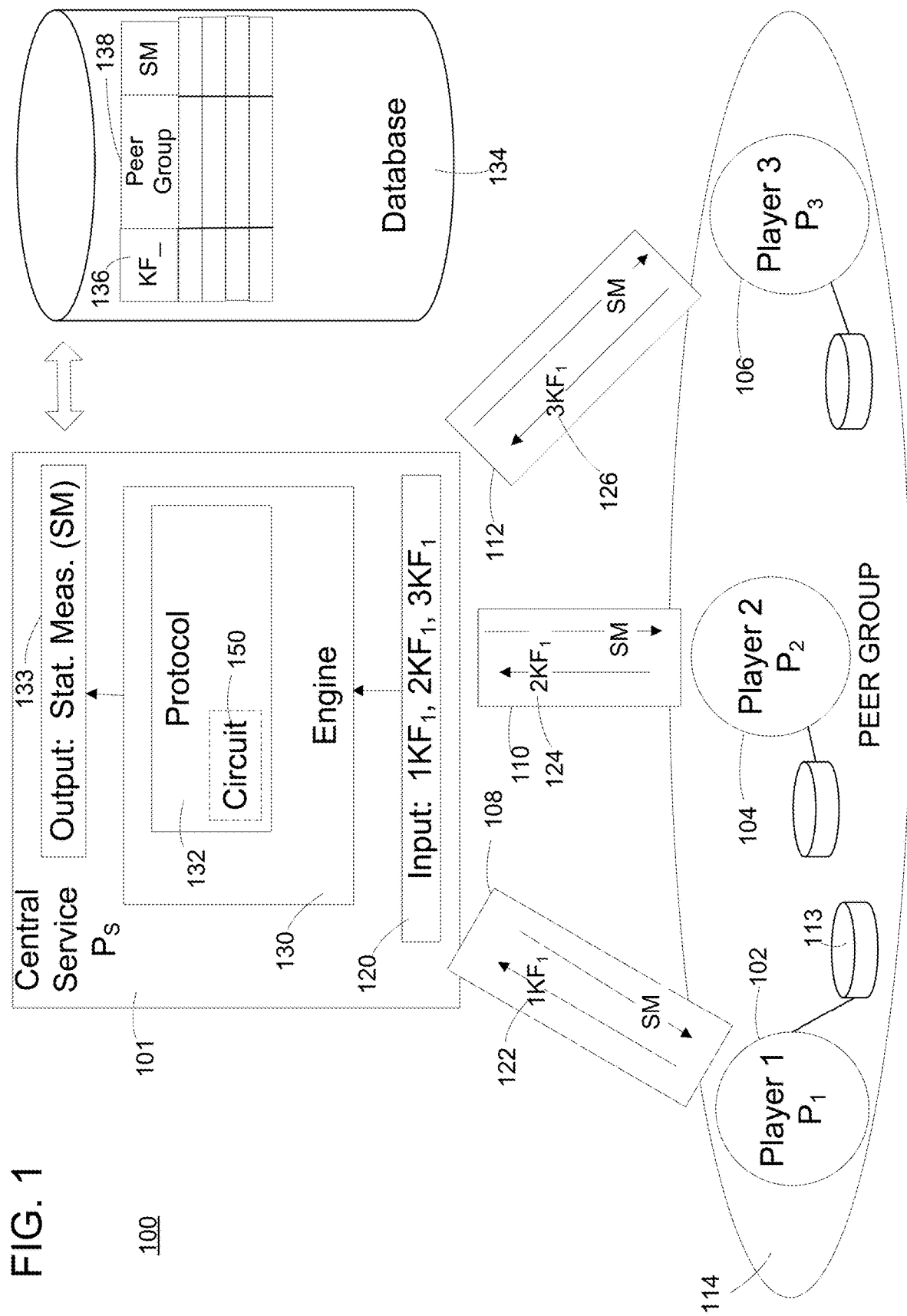
FIG. 1 shows a simplified diagram of a system according to an embodiment.

FIG. 1 shows a simplified view of an example system that is configured to implement private benchmarking according to an embodiment. Specifically, system 100 comprises central service provider $P_S$ 101 that is in communication with each of players $P_1$ 102, $P_2$ 104, and $P_3$ 106 through respective pairwise communication channels 108, 110, and 112.

Each of the Players may have associated therewith, a client database 113 for storing information such as key figures. Players $P_1$-$P_3$ belong to a peer group 114. That is, the central service provider is configured to return in a privacy-preserving manner, a statistical measure reflecting comparison of key figures between the players of the peer group. It is noted that one or more of the players may also variously belong to other peer groups, for purposes of private data comparison according to a statistical measure.

Specifically, $P_1$ provides as input 120 to the $P_S$, an encrypted first value (1$KF_1$ 122) for a particular key figure ($KF_1$, e.g., cost) that has relevance to other members of the peer group. Similarly, $P_2$ and $P_3$ provide as input to the $P_S$, encrypted second and third values (2$KF_1$ 124, 3$KF_1$ 126) of that particular relevant key figure $KF_1$.

Engine 130 of the central service provider receives this input, and executes thereon a secure computation protocol 132. According to particular embodiments, the protocol may be executed in a dialog-like manner with the service provider together with the players in multiple rounds.

The output of this secure computation protocol is a statistical measure (SM) 133 reflecting 1$KF_1$, 2$KF_1$, and 3$KF_1$. Examples of that statistical measure can include top quartile, and bottom quartile, as well as others.

According to certain embodiments, the statistical measure is inherently generated as part of a secure computation protocol. One example of this approach is the semi-homomorphic encryption scheme with additive homomorphic property, that is discussed below.

According to some embodiments, the statistical measure may be generated by a circuit 150 (e.g., a Boolean circuit) that is present as part of the engine. Examples of this approach are the garbled circuits, secret sharing, and (semi or fully) homomorphic encryption secure computation schemes also discussed later below.

The central service provider then stores in the database 134, the statistical measure as identified by a data object also including the key figure type 136 (e.g., cost) and the particular peer group 138 for which it was created.

The central service provider then returns to each of the players, the same statistical measure. This statistical measure allows the player to benchmark against members of its peer group, its particular value for the key figure.

Moreover, this statistical measure is generated in a privacy preserving manner revealing none of the following properties:

the players of the peer group; or
the values of the individual key figures supplied by the players; or
association between any specific player and any particular key figure value.

Instead, all that a particular player knows is the value of its own key figure, and the returned statistical measure relevant to its peer group. For example: "my value for $KF_1$ places me in the top quartile of the key figure KF within my peer group".

Figure 2:
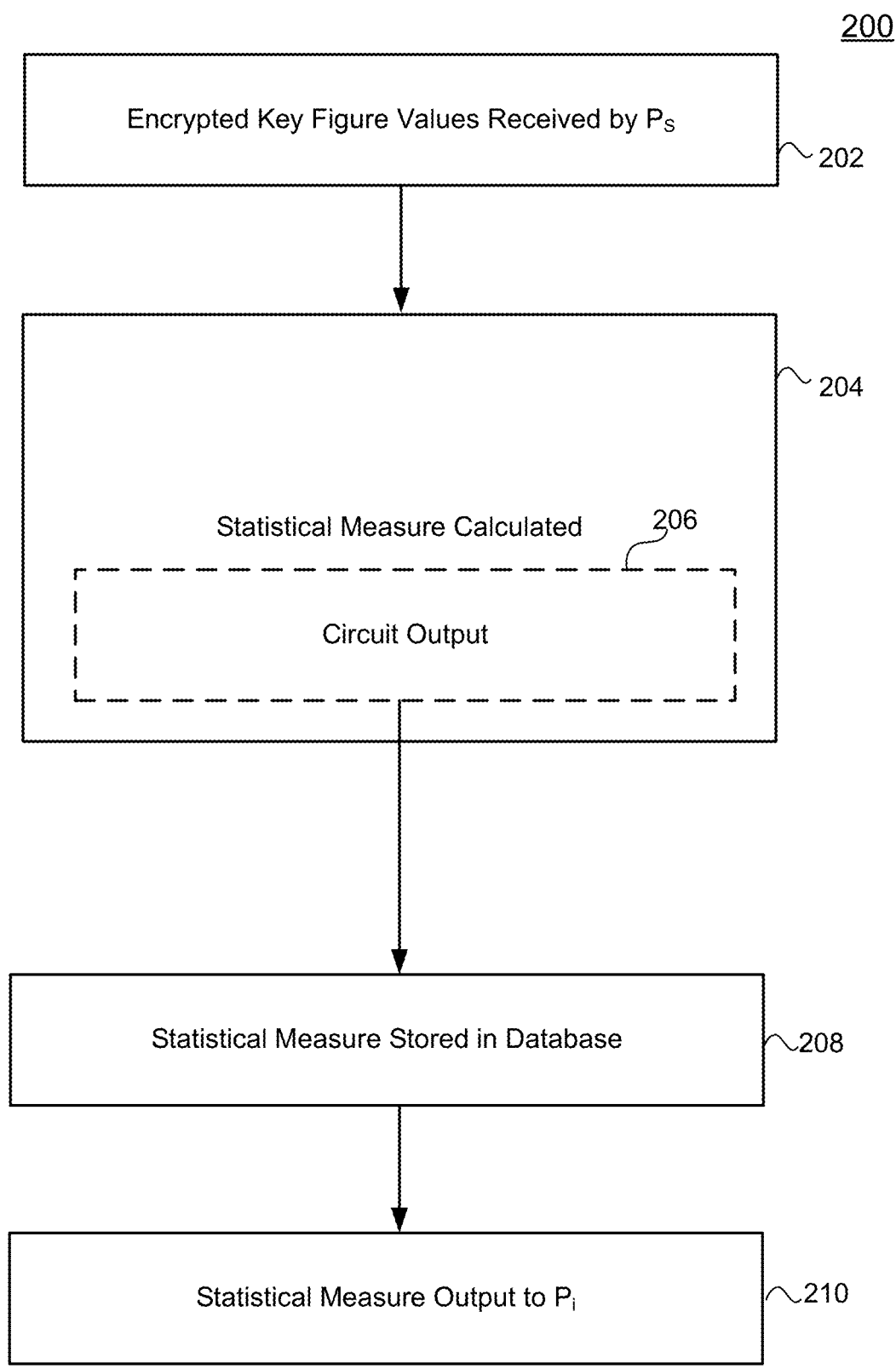
FIG. 2 shows a simplified flow diagram of a method according to an embodiment.

FIG. 2 is a flow diagram showing various actions taken in a method 200 according to an embodiment. At 202, the engine of the central service provider receives values for a key figure from each of a plurality of players.

At 204, the engine calculates a statistical measure reflecting the key figure inputs, utilizing a secure computation protocol. At 206, the flow diagram optionally shows the statistical measure as being output by a circuit.

At 208, the engine saves the statistical measure with other information (e.g., peer group), as a data object in a database.

At 210, the engine returns the statistical measure to each of the players. The players are then free to perform benchmarking analysis and Details of privacy preserving benchmarking amongst a plurality of players in a peer group utilizing a central service provider, are now discussed in connection with the following examples.

EXAMPLE

A first exemplary protocol for a privacy-preserving benchmarking platform, exhibits constant cost, provides anonymity, and is centralized. As used here, constant cost refers to constant round complexity, and constant (i.e., linear in the size of the security parameter k) communication complexity. Both are independent of the peer group size.

The protocol of this example utilizes a single server as the service provider $P_S$ of the benchmarking platform. The service provider acts as a participant in the protocol without providing input, i.e. as a processor.

This example protocol provides the benchmarking platform with the following statistical measures:
mean;
variance;
maximum;
median;
best-in-class (mean of the top 25%);
bottom quartile; and
top quartile.

This first exemplary protocol is based upon a semi-homomorphic encryption scheme with additive homomorphic property. Specifically, given:
E(.)=a (randomized) encryption function of such a cryptosystem, and
D(.)=the corresponding decryption function, it holds that $D(E(x_1) \cdot E(x_1)) = x_1 + x_2$ Paillier's encryption scheme may be of particular value here.

Prior to the actual protocol execution, a Trusted Third Party (TTP) is required for registration and key establishment. Key establishment allows for the creation of pairwise secure channels.

The TTP provides each player $P_i$ with the following two keys.
$K_{DEC}$ is the secret decryption key of the homomorphic encryption scheme. The service provider $P_S$ only knows the corresponding public encryption key $K_{ENC}$, which is known to every participant, but not the decryption key.
$K_{MAC}$ is the symmetric key of the Message Authentication Code (MAC). It is not known to the service provider $P_S$.

For each KPI comparison and for each peer group, one protocol execution is required. Every protocol execution involves n+1 participants, i.e. n players $P_i$ and one service provider $P_S$. Each participant obtains the output of the protocol.

This output is a floating-point number; the input is an integer. Where the input is not an integer, the input is to be scaled.

A protocol execution comprises four rounds. Every player communicates with the service provider at least once per round. The order of players communicating with $P_S$ can vary from round to round.

This exemplary protocol is a combination of the techniques:
summation,
rank computation,
selection, and
decryption.

Summation of encrypted values is conducted by multiplying the ciphertexts. For n values $x_i$, the encrypted sum is $$E(\text{sum}) = E\left(\sum_{i=1}^{n} x_i\right) = \prod_{i=1}^{n} E(x_i)$$

Summation is required for calculating the mean (mean) in steps 1. and 2., and the variance (variance) in steps 13. and 14. The sum is blinded by adding a random value. Because the players know the size n of the peer group, each player can compute the mean himself by dividing the sum he gets from $P_S$ by n.

Rank computation yields the rank of a value $x_i$ in a list which is sorted in descending order. To achieve this sorting, the value $x_i$ is compared to each value $x_j$. For that comparison, the indices of the secret values are permuted by the permutations $\phi$ and $\phi'$.

The assigned element of i is denoted by $\phi(i)$ while the one of j has index $\phi'(j)$. The difference between $X\phi_{(i)}$ and $X_{\phi'(j)}$ is blinded by two random values: $1 \leq r_{2j}$ and $0 \leq r_{3j} \leq r_{2j}$. These are chosen individually from $\mathbb{N}$ for each j.

The randomized difference $$c_{\phi(j),\phi'(i)} = r_{2j} \cdot (x_{\phi(i)} - x_{\phi'(j)}) + r_{3j}$$

is stored in the vector $\vec{c_{\phi(j)}}$. Counting the non-negative elements of that vector yields the position $pos(\vec{c_{\phi(j)}})$ of the value $X_{\phi(i)}$. Based on that, the rank is:

$$rank_{\phi(i)} = n - pos(\vec{c_{\phi(j)}}) + 1$$

Now, due to the permutations, each player $P_i$ holds the rank of the value $X_{\phi(i)}$ of some player $P_{\phi(i)}$. Rank computation is done once in the protocol (at step 3.). It is required for calculation of the mean, variance, and the best-in-class (bic).

Selection is the act of computing the ciphertext of a secret value $x_j$ with specific (i.e., selected) rank. First, $P_S$ chooses a random value $r_i$ individually for each player $P_i$ and computes the two ciphertexts:

$$E(x_{\phi(i)} + r_i)$$

$$E(r_i).$$

The former ciphertext is the value of specific rank blinded by the random value. The latter ciphertext is a 0 blinded by $r_i$.

By using a 1-out-of-2 oblivious transfer protocol, a player $P_i$ receives $E(x_{\phi(i)} + r_i)$ (i.e., the blinded secret value), only if his assigned rank is the one selected. The other players receive the blinded 0.

Afterwards, each player re-randomizes the value previously received by multiplying it by an encrypted 0, and sends the product back to the service provider.

The service provider then multiplies the encrypted values received, removes the random values $r_i$, and gets the ciphertext of $x_{\phi(i)}$.

Selection is required for computing the median (median), best-in-class, and the maximum (max). Selection occurs in the following steps of the protocol:
steps 4. to 6. (oblivious transfer),
steps 10. to 12. (returning the selected values), and
steps 15. to 17. (computing the results).

Decryption by the service provider is required since he is supposed to learn the result first. By ensuring this happens, the service provider is able to round the result to an insensitive value before sending it to the players.

To decrypt the result v, $P_S$ first blinds the result with a random value r and sends the ciphertext E(v+r) to the players.

Each player $P_i$ decrypts the blinded result and sends the plaintext v+r together with the corresponding message authentication code tag (below) back to $P_S$.

$$\theta_i = MAC(v+r\|i, K_{MAC})$$

The service provider gets the result v by subtracting the random value r.

To prove that he sent the same encrypted result to every player $P_i$, the service provider computes the hash (below) of the MACs $\theta_i$ received by using a cryptographic hash function.

$$h(\theta_1 = MAC(v+r\|1, K_{MAC}), \ldots, \theta_n = MAC(v+r\|n, K_{MAC}))$$

Together with the result v, $P_S$ sends this hash to the players.

Each player then computes the MACs and the hash locally, followed by comparing the hash to the one received from the service provider. The result of that comparison is a validation bit $v_{si}$ where s indicates the protocol step.

This validation bit is 1 in case of successful hash validation, and 0 otherwise. It states whether the service provider has sent the same statistical measure to each player or not.

Decryption is required for each of the statistical measures mean, variance, median, maximum, and best-in-class. Decryption occurs in the following steps of the protocol:
steps 2. and 14.-17. (sending encrypted results),
steps 7., 8., and 19.-26. (returning decrypted, blinded results),
steps 9. and 27.-30. (sending decrypted results), and
steps 18. and 31.-34. (sending the hashed MACs).

The full protocol is depicted in FIGS. 3A-D. The participants executing a particular step, are summarized as follows:

In step 4. of Round 2, the selection criterion of the OT protocol $$pos(\vec{c_{\phi(i)}}) = \left\lceil \frac{n}{2} \right\rceil$$

is the index of the sorted list's middle element. For computation of the bottom quartile in step 6B. the bottom quartile index which is $$\left\lceil \frac{n}{4} \right\rceil,$$

is turned into the selection criterion $$pos(\vec{c_{\phi(i)}}) = \left\lceil \frac{n}{4} \right\rceil.$$

The same applies to the top quartile computation in step 6C., where the selection criterion is $$pos(\vec{c_{\phi(i)}}) = \left\lfloor \frac{3 \cdot n}{4} + 1 \right\rfloor.$$

The OT steps are only the first part of the selection of Round 2. The steps 12B. and 12C function to re-randomize the ciphertext received from the server in the OT steps 6B. and 6C., by multiplying it with the encrypted identity element 0.

In Round 3, steps 17B. and 17C. return the encrypted, rank-based statistical measures to the players similar to steps 15. to 17. These values are computed by multiplying the n encrypted, re-randomized OT messages that the service provider received from the players $P_i$ in steps 12B. and 12C.

Additionally, the statistical measures are blinded by multiplying the product by an encrypted random value $r_{10B}$ and $r_{10C}$, respectively.

In steps 25B. and 25C., each player $P_i$ decrypts the blinded bottom quartile and top quartile statistical measures received in steps 17B. and 17C. and sends the result to $P_S$, in the same manner as steps 19., 21., 23., and 25.

In steps 26B. and 26C., each player sends the MAC of the blinded bottom quartile and top quartile, respectively. These

| Round 1 (FIG. 3A) | | Round 2 (FIG. 3B) | | Round 3 (FIG. 3C) | | Round 4 (FIG. 3D) | |
|---|---|---|---|---|---|---|---|
| Step | Executing Participant | Step | Executing Participant | Step | Executing Participant | Step | Executing Participant |
| 1. | Player | 2-6C. | Service Provider | 14-18. | Service Provider | 31-34C. | Service Provider |
|  |  | 7-8. | Player | 19-26C. | Player |  |  |
|  |  | 9. | Service Provider | 27-30C. | Service Provider |  |  |
|  |  | 10-13. | Player |  |  |  |  |

The purpose of Round 1 of the protocol is for the players to transmit the encrypted input to the service provider.

In Round 2, oblivious transfer (OT) steps 6B. and 6C. are part of the selection of the bottom and the top quartile values of the sorted list of inputs. These work in the same way as the OT steps 4. to 6.

blinded statistical measures are concatenated with the player $P_i$'s index i before computing the corresponding MAC (as in steps 20., 22., 24., and 26.)

The last two new steps of Round 3 are labelled 30B. and 30C. Similar to steps 27. to 30., these are used by the service provider to send the output (i.e., the decrypted, unblended statistical measures) to the players.

In Round 4 of the protocol, steps 34B. and 34C. are used by the service provider to distribute the hashed MACs of the statistical measures. Step 34B. is the hash of the n bottom quartile MACs that the players sent to $P_S$ in step 26B. Step 34C. is the hash of the n top quartile MACs, which the service provider received in step 26C.

EXAMPLE

One potentially valuable area for potential global optimization, involves customers comparing themselves against competitors and then making an educated investment decision for improving steps in a business process (i.e., to discover and reduce cost drivers). More precisely, the customers may compare various statistical measures over Key Performance Indicators (KPI). This particular example is presented in conjunction with the Product Lifecycle Costing (PLC) approach offered by SAP SE of Walldorf, Germany.

Value Lifecycle Management (VLM) is an online service offered by SAP SE of Walldorf, Germany, that supports customers in identifying proper KPIs for their industry and market and comparing them against peers. Embodiments provide customers with confidence in maintaining the privacy of their sensitive benchmarking data instead of having to trust SAP acting as a TTP.

In particular, the exemplary secure benchmarking protocol has two different kinds of participants (i.e., n players and one service provider). Both kinds need to be implemented to allow protocol execution.

Therefore, the prototype consists of two separate implementations: a client and a service. However, these implementations share some similarities like cryptographic and communication functionalities. To increase code reusability, they may be written in the same programming language.

The service provider's part may be run as a cloud service. Examples can include but are not limited to the SAP Cloud Platform or the Cloud Foundry (CF) service. Cloud Foundry is an open-source cloud application platform developed by the Cloud Foundry Foundation which uses shared industry standards.

With its container-based architecture, CF allows running code in any programming language. By default, applications run in Cloud Foundry Linux containers. However, depending on the service provider who hosts the CF platform, further containers can be supported.

The container being used defines the programming language that the cloud application has to be written in. In case of SAP Cloud Platform as the CF platform provider, the only additional containers provided are Docker containers.

Examples of supported runtimes are Node.js and the Java Runtime Environment. Node.js is a JavaScipt runtime for server-sided JavaScript execution, making it unsuitable for client-side implementations. Therefore, the client and the service were chosen to be written in Java.

Similar to the communication of SAP PLC, client and service communicate via HTTPS while the data being transmitted is JSON strings. The benchmarking service is implemented in the form of a Java servlet. Those are widely-used Java programs that can be utilized for developing web applications.

Java servlets that extend the Java class HttpServlet natively support HTTP(S) functionalities. However, they are stateless and do not remember previous requests and responses.

To provide the servlet with a state and to allow persistent storage of peer groups and the output throughout and beyond a protocol execution, a database is required. For that purpose, the service implementation has access to the database management system PostgreSQL.

PostgreSQL is offered by SAP Cloud Platform as a service that a cloud service can utilize. The Java servlet is executed inside a Tomcat web server which in turn runs inside a Cloud Foundry Linux container.

The client may be a Java console application that runs the benchmarking protocol together with the benchmarking service. However, a SAP PLC front end add-in (which is written in C# and based on this client console application) is presented below.

Similar to the service implementation, the client application has access to a database management system. The client's database is a PostgreSQL database, which is independent of the service's database. Also providing the client with a PostgreSQL database, permits code reusability. The same applies to the JSON implementation, which is based on Google's open source gson library.

Figures 3D, 4:
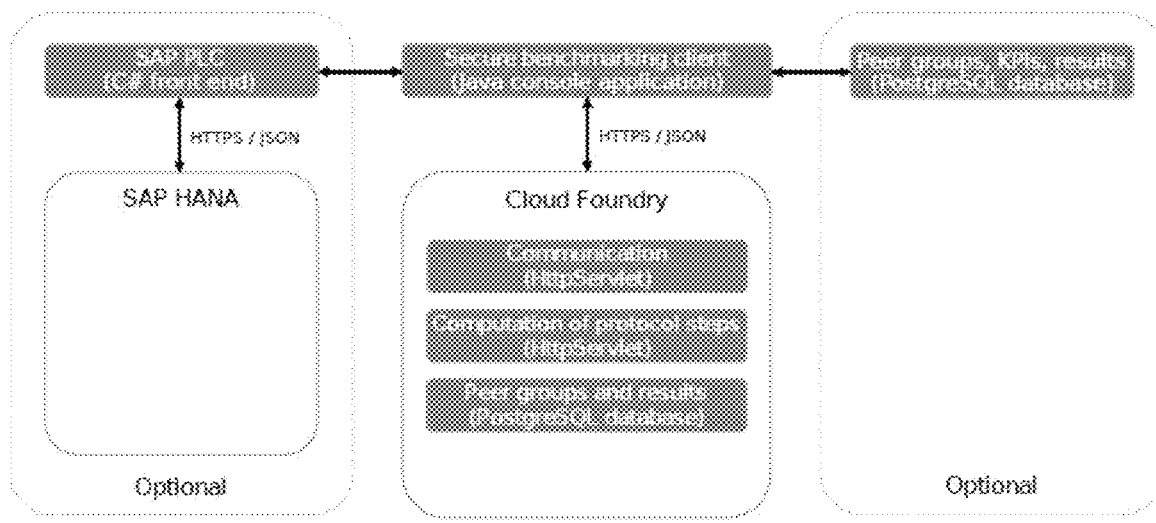

FIG. 4 is a simplified block diagram providing an overview of one example of the secure benchmarking system including the SAP Product Lifecycle Costing (PLC) integration.

Service implementation is now described. In particular, the service is implemented in the form of a Java servlet. In the following, an overview of the service's architecture is given, including the classes and significant methods.

The code structure of the service is a Java servlet comprising the three source packages: benchmarking, service, and crypto. The benchmarking package contains Java classes that define the structure of a benchmark's control information, the messages, peer groups, intermediate results, and the overall results.

Figure 5:
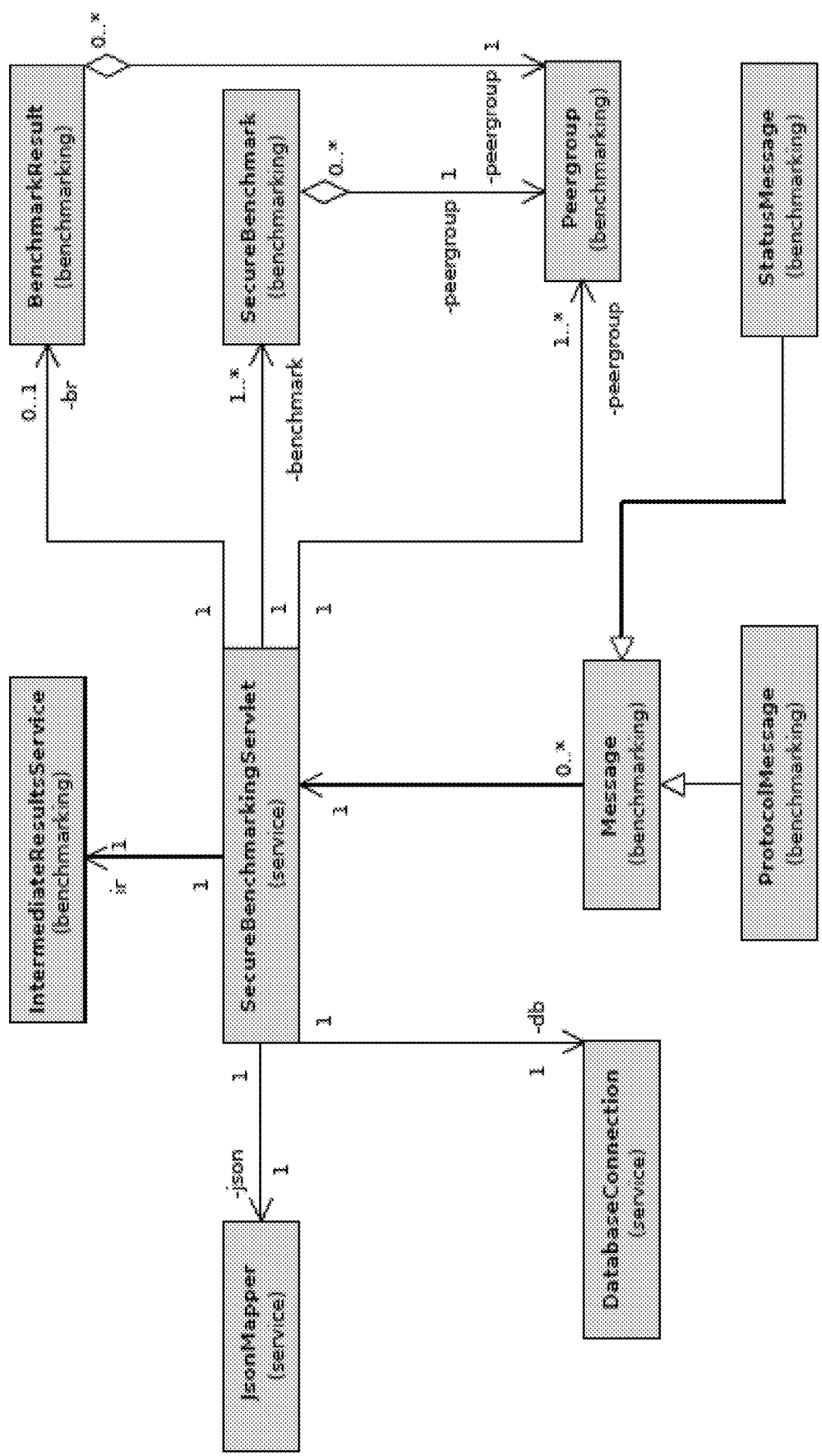
FIG. 5 presents a simplified brief class diagram of the service containing the classes of the packages benchmarking and service.

A brief overview of these classes is given in FIG. 5. Without including attributes or method names, this figure depicts the relationships between the classes of both the benchmarking and the service package. Further details regarding these classes are now provided.

The SecureBenchmark class provides a structure for the control information and benchmarking details characterizing a single protocol execution, i.e. a benchmark. This includes an ID of the benchmark, the peer group, the KPI name as well as the current round of the execution and a counter for the number of players who have already completed the current round.

The Peergroup class defines the form of the peer groups maintained by the secure benchmarking service.

The IntermediateResultsService class organizes the intermediate results and random variables of a protocol execution held by the service.

The BenchmarkResult class arranges the results, i.e. statistical measures, of a protocol execution. The intermediate results are the values of steps 1. to 34C.

The Message class provides a structure for messages exchanged by clients and service during a protocol execution.

The StatusMessage class defines the status messages exchanged by clients and service during a protocol execution, extending the Message class. Status messages are special messages that carry control information, such as a polling delay and the current round.

The ProtocolMessage class provides a structure for protocol messages exchanged by clients and service during a protocol execution. It also extends the Message class. Protocol messages are special messages that carry actual values of protocol steps, such as intermediate results.

Different from the benchmarking package, the service package includes classes that describe the servlet itself as well as its interaction with the environment, i.e. client and database. The service package comprises the following classes.

The SecureBenchmarkingServlet is the main class of the secure benchmarking service. It contains methods for each step of the benchmarking protocol as well as auxiliary methods.

The JsonMapper class encapsulates the required JSON functionality. It provides methods for transforming Java objects into JSON strings and vice versa. For this serialization and deserialization, Google's open source gson library is used.

The DatabaseConnection class encapsulates the entire database interaction. It comprises methods for initializing the service's database as well as storing, updating, and loading Java objects from the database. The class offers the following four database tables.

benchmarks: This table stores available benchmarks in the form of SecureBenchmark objects. That includes upcoming protocol executions as well as benchmark executions which are in progress. The columns match the attributes of the SecureBenchmark class.

peergroups: In this table, the peer groups maintained by the secure benchmarking service are stored. The columns comply with the attributes of the Peergroup class.

intermediate_results: This table stores the values of the protocol steps. The columns match the attributes of the IntermediateResultsService class.

brenchmark_results: In this table, the overall results, i.e. statistical measures, of previous benchmarks are stored. The columns of the table are equal to the attributes of the BenchmarkResult class.

The crypto package comprises classes that define a structure for keys and provide randomness, hashing with the SHA-1 hash function, and an OT implementation. Furthermore, a class for cryptographic operations, such as addition, multiplication, and encryption of plaintexts, based on Paillier's cryptosystem is provided.

For key distribution, the service has pre-installed Paillier keys with the key lengths 768, 1024, 1536, and 2048 bits, which are provided in separate key files. The key length and the key being used throughout the protocol execution are hard-coded in the SecureBenchmarkingServlet class but can be changed manually.

The class SecureBenchmarkingServlet is the main class of the service. It implements the protocol, extending the Java class HttpServlet, which provides the service with HTTP(S) functionalities.

Based on that, this class can process secure HTTP GET and POST requests with the two methods doGet( ) and doPost( ) These requests can be sent to different Uniform Resource Identifiers (URI), each connected to different methods of the SecureBenchmarkingServlet class.

Depending on the path of the URI requested by the client, doGet( ) and doPost( ) call the method that handle the corresponding request. The mapping of the supported paths and the methods is shown in the following tables.

Specifically, the following table shows mapping of the service's paths and the Java methods for GET requests.

| Paths of the secure benchmarking service for GET requests | | |
|---|---|---|
| Path | Java method | Purpose |
| / | get( ) | Returns lists of available peer groups, benchmarks, and benchmark results |
| /publicKey | get_publicKey( ) | Returns server's public key for OT subprotocol |
| /resetDatabaseDefault | get_resetDatabaseDefault( ) | Resets database tables |

The methods get( ) and get_resetDatabaseDefault( ) are implemented for evaluation purposes. The former shows the service's database entries except for the intermediate results, while the latter resets the database tables.

In this case, resetting the database tables includes dropping any entry in the four tables and initializing predefined default peer groups. These peer groups may not have a list of participants. Instead, they have a size n and allow exactly n players $P_i$ with $0 \leq i \leq n$ to participate. A method for resetting the database tables should not be available to players in a real-world scenario.

The following table shows mapping of the service's paths and the Java methods for POST requests.

| Paths of the secure benchmarking service for POST requests | | |
|---|---|---|
| Path | Java method | Purpose |
| / | post( ) | Protocol steps, post( ) calls method that implements current round |
| /pollRound | post_pollRound( ) | Polling for next round |
| /obliviousTransfer | post_obliviousTransfer( ) | Request for OT subprotocol, returns one out of two values |
| /requestBenchmark | post_requestBenchmark( ) | Creating new benchmark |
| /benchmarkAvailable | post_benchmarkAvailable( ) | Returns list of available benchmarks if there is any |

The method post( ) handles the interaction of the protocol steps, except for the OT steps 4. to 6C. Those are requested by calling the method post_obliviousTransfer( ).

Depending on the round the benchmark is currently in, post( ) calls the method that implements the corresponding steps. These are as follows.

The method round1( ) receives the value of step 1. and stores it in the database table intermediate_results.

The method round2Part1( ) returns the values of steps 2. and 3. They were precomputed by the method round2Precomputation( ) after the last player completed the first round.

The method round2Part2( ) receives and stores the values of steps 7. and 8. and computes and returns the value of step 9.

The method round2Part3( ) receives and stores the values of steps 10. to 13.

The method round3Part1( ) returns the values of steps 14. to 18. They were precomputed by the method round3Precomputation( ).

The method round3Part2( ) receives and stores the values of steps 19. to 26C. and computes and returns the values of steps 27. to 30C.

The method round4( ) returns the values of steps 31. to 34C. They were precomputed by the method round4Precomputation( ).

Based on these methods, the service provider conducts its part of the secure computation protocol as described above.

Implementation of the client for this exemplary secure computation protocol is now described. The client prototype is implemented in the form of a Java console application.

The code structure of the client comprises the three source packages: benchmarking, client, and crypto. The benchmarking package is very similar to the benchmarking package of the service. The classes SecureBenchmark, Peergroup, Message, ProtocolMessage, and StatusMessage are exactly the same classes as used by the service.

The class IntermediateResultsService, however, is not part of this group. Instead, the package contains the following two additional classes.

The IntermediateResultsClient class organizes the intermediate results of a protocol execution held by the client. These are the values of steps 1. to 34C.

The KPI class provides a structure for the KPIs of the client. It contains both the KPI's name as well as its value.

In view of this, the class BenchmarkResult has an additional attribute of the type KPI. That attribute indicates the name and the value of the KPI that was compared in a particular benchmark.

Figure 6:
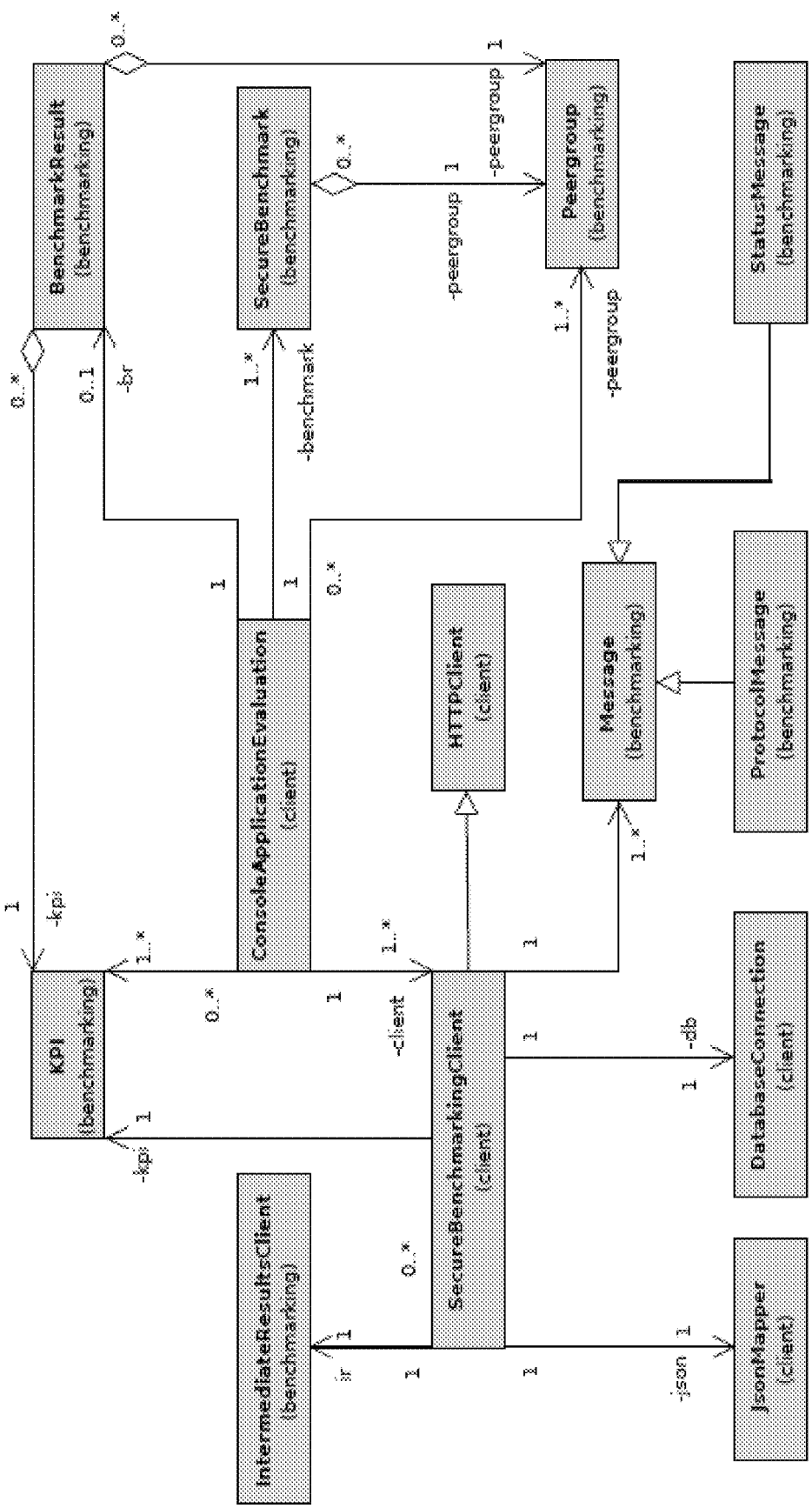
FIG. 6 presents a simplified class diagram of the client containing the classes of the packages benchmarking and client.

FIG. 6 offers a brief overview of these classes. Without including attribute or method name details, this figure shows the relationships between the classes of the packages benchmarking and client.

Similar to the service package of the service, the client package includes the client's main class as well as the classes that specify the interaction with the client's environment (i.e., service and database). These classes are as follows.

The SecureBenchmarkingClient is the main class of the secure benchmarking client. It includes methods for each step of the benchmarking protocol as well as auxiliary methods.

The HTTPClient class encapsulates the communication via the HTTPS protocol. It provides the client with methods for GET and POST requests as well as for defining an HTTPS proxy if one is required.

The ConsoleApplicationEvaluation class is an auxiliary class that is called when the console application is executed from a player's command line. It instantiates and initializes on object of the type SecureBenchmarkingClient for each protocol execution.

The JsonMapper class encapsulates the required JSON functionality. It comprises methods for transforming Java objects into JSON strings and vice versa.

The DatabaseConnection class encapsulates the entire database interaction. It includes methods for initializing the client's database as well as storing, updating, and loading Java objects from the database. This class provides the following five database tables.

benchmarks: In this table, available benchmarks are stored in the form of SecureBenchmark objects. It includes upcoming protocol executions as well as benchmark executions that are currently in progress. The columns comply with the attributes of the SecureBenchmark class.

peergroups: This table stores the peer groups that the player is part of. The columns match the attributes of the Peergroup class.

intermediate_results: In this table, the values of the protocol steps are stored. The columns comply with the attributes of the IntermediateResultsClient class.

brenchmark_results: This table is used for storing the overall results, i.e. statistical measures, of previous benchmarks. The columns of the table match to the attributes of the BenchmarkResult class.

kpis: In this table, the KPIs of a player are stored. The table's columns are equal to the attributes of the KPI class.

Usage of the database may be optional. It can be disabled in the SecureBenchmarkingClient class.

The client's crypto package is very similar to service's package. Additionally, it provides the service with a method for decryption of Paillier ciphertexts.

The client also has access to pre-installed keys that match the keys of the service. Accordingly, the same key lengths of 768, 1024, 1536, and 2048 bits are available.

The key length and the key being used throughout the protocol execution can be changed manually as they are hard-coded in the SecureBenchmarkingClient class. However, they have to match the key length and keys of the other players and the service provider.

The main class of the client implementation is the SecureBenchmarkingClient class. This class extends the class HTTPClient, which provides it with HTTP(S) functionalities. The most important methods of that main class are as follows.

The method requestBenchmark( ) sends a POST request to the /requestBenchmark path of the servlet to create a new benchmark.

The method pollBenchmarkInitialise( ) sends a request to the service's path /benchmarkAvailable asking for a list of available benchmarks for peer groups that the player is a member of. It also initializes an IntermediateResultsClient object for the upcoming protocol execution.

The method round1( ) executes the first round of the benchmarking protocol by computing and sending the value of the first step, i.e. the encrypted input, to the service.

The method pollRound( ) sends requests for the next round to the service's path /pollRound until the service is ready for the next round.

The method round2Part1( ) executes steps 2. and 3. of the protocol by requesting the corresponding values from the service.

The method round2ObliviousTransfer( ) implements the player's part of the OT subprotocol required for steps 4. to 6C. of the benchmarking protocol. It calls the service's path/obliviousTransfer to retrieve the respective values.

The method round2Part2( ) computes the values of steps 7. and 8. of the protocol and sends them to the service. It then receives the value of step 9. in response.

The method round2Part3( ) computes the values of steps 10. to 13. of the protocol and sends them to the service.

The method round3Part1( ) requests the values of steps 14. to 18. of the protocol from the service.

The method validateHashedMAC( ) validates the hashed MAC of a statistical measure given the blinded measure and the hash of each client's MAC. It is required for steps 18. and 31. to 34C.

The method round3Part2( ) computes the values of steps 19. to 26C. of the protocol.

The method round3Part3( ) sends the values of steps 19. to 26C. of the protocol to the service and receives the values of steps 27. to 30C. in response.

The method round4( ) requests the values of steps 31. to 34C. of the protocol from the service.

Furthermore, the methods round2( ) and round3( ) are provided for convenience purposes. They call the methods round2Part1( ) round2Part2( ), and round2Part3( ) and round3Part1( ), round3Part2( ), and round3Part3( ) respectively.

With these methods, each player $P_i$ computes its part of the protocol

The ConsoleApplicationEvaluation class is implemented in a way that suits the evaluation and demonstration purposes of the prototype. When executed from the command line, its main method is called, representing a player. As command line arguments, it requires the player $P_i$'s index, i.e. ID, as well as the size n of the peer group that the player's KPI is supposed to be compared to.

The players' indices of a particular peer group may be consecutive numbers that only need to be unique within this peer group. This facilitates the computation of the hashed MACs in steps 18. and 31. to 34C.

To allow automation of repeated protocol executions, the following procedure comprising benchmark request and protocol execution is placed in a loop. For the same purpose, the player's KPI value is chosen at random for each loop cycle. It is of the Java type double. This loop is referred to as benchmarking loop.

To get involved in a protocol execution, player $P_i$ creates a new SecureBenchmarkingClient object. The values that have to be passed to the constructor of the class for instantiating such an object are the player's index, his KPI value, and the peer group name as well as the desired Paillier key length and a proxy flag. The latter states whether a proxy is to be set for the communication between client and service.

The KPI value has to be of the Java data type double. If this is not the case, an exception is thrown, inhibiting the protocol execution. For the console application, this is always guaranteed since the KPI value is created as a double value by the console application itself.

If the player's index is 0, he calls the SecureBenchmarkingClient method requestBenchmark( ), triggering a new protocol execution. The peer group for this protocol execution is automatically set to one of the service's predefined peer groups that has the given size n. Otherwise, if the player's index does not equal 0, he starts polling for available benchmarks by calling the SecureBenchmarkingClient method pollBenchmarkInitialise( ).

Once a player has learned about the new benchmark, he starts the protocol execution by calling the SecureBenchmarkingClient method round1( ). In this method, the player's secret value is scaled to an integer value by multiplication with the constant value followed by encryption with the secret Paillier key.

The resulting ciphertext is of the Java data type BigInteger. Consequently, the value of step 1. is also a BigInteger value.

The same applies to most of the values computed during a protocol execution. The only exception are the MACs and hashed MACs of steps 8., 18., 20., 22., 24., 26., 26B., 26C., and 31. to 34C. as well as the statistical measures of steps 9. and 27. to 30C.

The MACs and hashed MACs are of the Java data type String while the statistical measures are double values. For the remaining protocol steps, the methods round2( ) round3( ) and round4( ) are called by the main method of the ConsoleApplicationEvaluation class. The resulting statistical measures as well as the required protocol execution time are written to the command line.

The SAP PLC front end add-in is now described. Integration of the client implementation with SAP PLC is desirable to provide every SAP PLC customer with built-in access to the secure benchmarking system.

In particular, the SAP PLC allows for individualization of its client application via front end add-ins. Such an add-in is C# class library, while the secure benchmarking client is implemented in Java.

To provide the secure benchmarking add-in with the functionalities of the client implementation, the add-in references the Java client implementation classes using the IKVM.NET Java virtual machine (JVM) for .Net.

Similar to the console application, the secure benchmarking add-in is specifically designed for evaluation and demonstration purposes of the secure benchmarking prototype. The add-in represents the player with index 0, i.e. player $P_0$, of a peer group.

For each player whose index does not equal 0, the console application waits for player $P_0$ to request a new protocol execution. In conjunction with n−1 players running the console application, the add-in therefore is the player of the peer group who requests new benchmarks.

Following the model-view-viewmodel (MVVM) design pattern, three main components were developed for the SAP PLC front end add-in.

The class SecureBenchmarkingAddIn is the main C# class of the add-in. It adds a new Benchmarking view to the Calculation view of SAP PLC and calls the methods of the SecureBenchmarkingClient class to run the protocol.

The class BenchmarkingViewModel is the view model class of the Benchmarking view. It provides methods for modifying the Benchmarking view.

The class Benchmarking View is the XAML file defining the design of the Benchmarking view.

Figure 7:
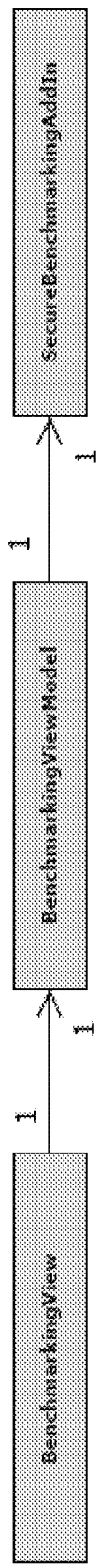

A brief overview of these classes is given in FIG. 7. Without showing details such as attributes or method names, that figure shows the relationships between the classes of the SAP PLC front end add-in.

As stated above, the class SecureBenchmarkingAddIn is the main class. Its most important methods are as follows.

The method Setup( ) adds an entry for the secure benchmarking add-in to the Analyze ribbon button of the Calculation view.

The method ExecuteOpenBenchmarkView( ) defines a new dialog, binds it to the Benchmarking view, and adds actions to the button click events.

The method BenchmarkInitialization( )creates and initializes a SecureBenchmarkingClient object and requests a new benchmark.

The method BenchmarkRound1( ) executes round 1 of the benchmarking protocol by calling the Java method round1( ) of the SecureBenchmarkingClient class.

The method BenchmarkRound2( ) calls the Java method round2( ) of the SecureBenchmarkingClient class to execute round 2 of the benchmarking protocol.

The method BenchmarkRound3( ) executes round 3 of the benchmarking protocol by calling the Java method round3( ) of the SecureBenchmarkingClient class.

The method BenchmarkRound4( ) calls the Java method round4( ) of the SecureBenchmarkingClient class to execute round 4 of the benchmarking protocol.

Figure 8:
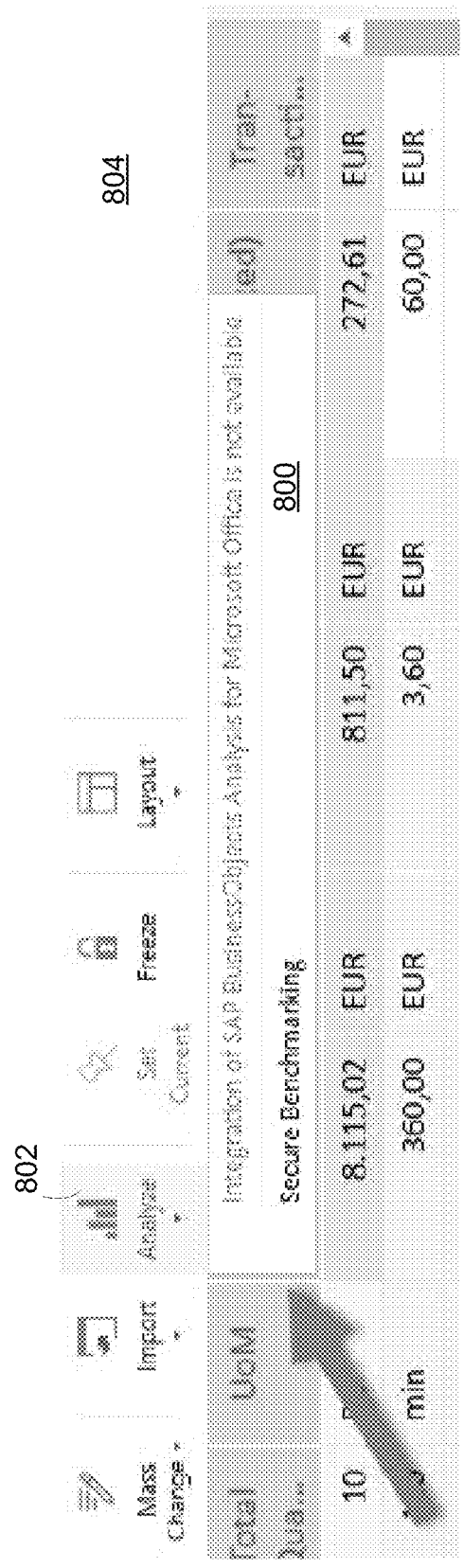
FIG. 8 shows a ribbon entry of the secure benchmarking add-in in a calculation view.

If the secure benchmarking add-in is registered in SAP PLC, the method Setup( ) adds a new ribbon entry 800 to the Analyze ribbon button 802 of the Calculation view 804 as shown in FIG. 8. When clicking this ribbon entry, the Benchmarking view appears in the form of the dialog depicted in FIG. 9.

In this dialog, the user can choose a key figure of the currently selected calculation version item, as well as the peer group that this key figure is to be compared to. Once the user clicks the start button, the method BenchmarkInitialisation( ) retrieves the data entered by the user from the Benchmarking dialog and creates a new SecureBenchmarkingClient object.

This method also ensures data type compatibility by converting the user's KPI to a double value. If this conversion fails, an exception is thrown.

With the SecureBenchmarkingClient object, a benchmark request is sent to the service and the protocol steps are executed. The progress bar between the Peer Group combo box and the Average text box shows the progress of the protocol execution. It is updated each time player $P_0$ completes a round.

After finishing the protocol execution, the statistical measures are written into the text boxes of the Benchmarking view. FIG. 9 shows the benchmarking view after finishing a protocol execution Communication during execution of the secure computation protocol according to this embodiment, is now described. Throughout a single protocol execution, client and service implementation communicate at least once per round. In case of rounds 2 to 4, the required polling adds further communication effort.

In general, the data being transmitted during a benchmark comprises JSON strings, which are serialized Java objects. In most cases, these Java objects are of the types Message, StatusMessage, or ProtocolMessage.

Objects of the type Message have a benchmark ID and a counter indicating the current round of the protocol. These objects are used by the client for sending polling requests to the service.

Objects of the type status messages (i.e., StatusMessage instances) are special Message objects. In addition to the attributes of the Message class, they can carry a date for the next request or a delay for the next request. Both values can be used by the service to determine when a client continues with the protocol execution.

Status messages are used by the service for the polling response, as well as for indicating the end of rounds 1 and 2 since these rounds do not require the service to send further protocol values.

Since the ProtocolMessage class extends Message, protocol messages are special Message objects. In addition to the inherited attributes, protocol messages hold a player's ID and up to three lists of protocol values. These lists carry values of the type BigInteger, double, and String, respectively.

Protocol messages are used by the client application for requesting or sending values of protocol steps, including the OT steps 4. to 6. The service in turn uses those messages for sending values of steps.

In Summary, status messages carry status or control information while protocol messages are used for transferring actual protocol values. However, there are several exceptions.

For instance, the service's response in the OT steps 4. to 6. is an object of the crypto package class OTSend. The request and response messages of benchmark requests are serialized SecureBenchmark instances. When polling for available benchmarks, the client sends a serialized Peergroup object and receives a list of SecureBenchmark objects. None of these messages contains an ID or other private data that does not match the requesting player's ID or private data.

As stated above, each message is sent via HTTPS. In conformance with the service provider model, there is no pairwise communication between players.

OTHER EXAMPLES

While the above has described one particular protocol for secure computation, embodiments are not limited to this. Other approaches could be employed.

Where possible statistical measures are provided for n secret values $x_i$ with $1 \leq i \leq n$, generic approaches to calculate the bottom quartile ($Q_B$) could be performed pursuant to the following equation, where $\tilde{x}_i$ denotes the i-th element of the sorted list of the values $x_i$, sorted in ascending order.

$$Q_B = \tilde{x}_{\lceil \frac{n}{4} \rceil}.$$

Similarly, generic approaches to calculate the top quartile could be performed pursuant to the following equation, again sorted in ascending order:

$$Q_T = \tilde{x}_{\lfloor \frac{3n}{4}+1 \rfloor}.$$

One alternative approach utilizes a garbled circuits protocol. Specifically, it evaluates the gates of the Boolean circuit using many two-party protocol executions based upon special permutations.

In order to cope with maliciously corrupted players, an engagement protocol is introduced. This subprotocol resorts to verifiable secret sharing and forces every player to provide the correct input in each round. Therefore, malicious adversaries either drop out or turn into semi-honest adversaries.

An approach may introduce a protocol implementing the garbled circuits approach for multiple parties without utilizing many two-party computations with many garbled circuits. Instead, a common garbled circuit C is jointly established by the players, and each player provides his input in a garbled form. The evaluation of the circuit is done locally without any communication.

Prior to the actual protocol execution, a fully connected network of secure pairwise channels and broadcast channels may be established. Secrecy of these channels can be realized based on an asymmetric cryptosystem such that each player $P_i$ generates a key pair $<K_{ENC}, K_{DEC}>$ of a public and a secret key and broadcasts the public key $K_{ENC}$ to each player $P_j$. Any player $P_j$ can now send messages encrypted with $P_i$'s public key and only $P_i$ can decrypt and read the messages Authenticity of the channels can be implemented in a similar way by providing a second key pair of an asymmetric cryptosystem and using it for signing messages. In that case, when sending a message, a player $P_i$ signs this message with his secret key and sends it to $P_j$, who can validate the signature with $P_i$ public key.

Connectivity of pairwise channels to a central server can serve to mediate anonymous communication between players.

Figures 10, 11:
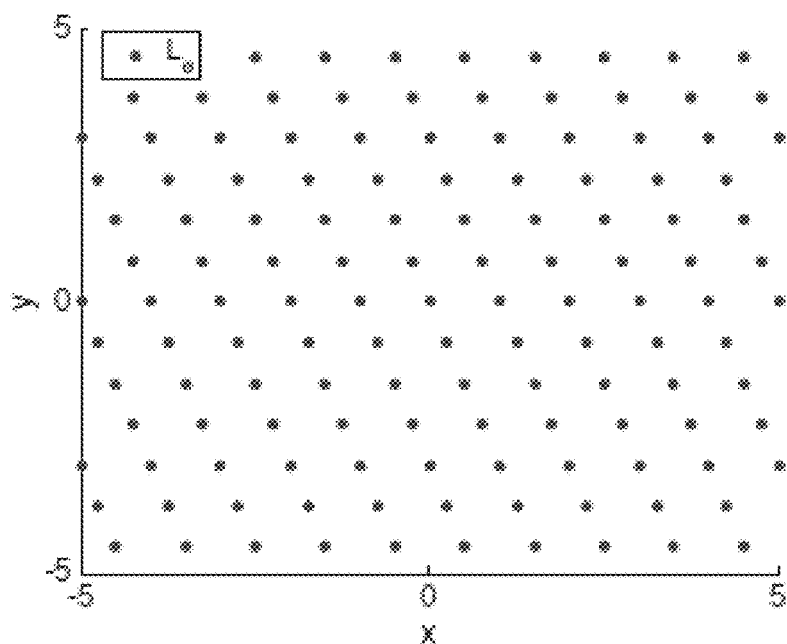
FIG. 10 shows partitioning in a garbled circuits protocol.
FIG. 11 shows the lattice defined by an example generator matrix.

A protocol involving a garbled circuits approach may use a pseudorandom generator G that turns i-bit strings into l-bit strings $s^i_j$ into $1+2 \cdot n \cdot l$-bit. The first l bits of the output are denoted by $F(s^i_j)$ while $G(s^i_j)$ stands for its next n·l bits and $H(s^i_j)$ for its last n·l bits. This partitioning is depicted in FIG. 10.

The w wires of the circuit each have two indices 2j and 2j+1 and are therefore denoted by $w_{2j}$ and $w_{2j-1}$ for $0 \leq j \leq w-1$. The complement of a bit $\lambda_j$ is denoted by $\overline{X}_i$.

Furthermore, a mechanism called collaborative coin flipping will be used during the protocol execution. This is a process for jointly establishing shared random bits among the players.

To accomplish this, each player commits to a random bit. The XOR of these random bits is the overall random value.

The protocol comprises two phases: phase I for generating the garbled circuit and the garbled input, and phase II for publishing and evaluating the circuit. All the participating players Pi execute the exact same steps in this protocol.

Phase 1 of the protocol involves generation of the garbled circuit and the garbled input. It has five steps.

At step 1., each player $P_i$ shares the bits of his secret input $x_i$ such that each input bit $b_{wj}$ is associated with input wire $w_j$.

At step 2., the players execute collaborative coin flipping $(2 \cdot 1 \cdot n + 1) \cdot w$ times to establish:

a. $2 \cdot n \cdot w \cdot l$-bit strings $s^i_j$ (seeds)
b. bits $\lambda_0, \ldots, \lambda_{w-1}$.

Each string $s^1_j \| \ldots \| s^n_j$ (super seed) corresponds to a bit such that $s^1_{2j} \| \ldots \| s^n_{2j}$ corresponds to $\lambda_j$ while $s^1_{2j+1} \| \ldots \| s^n_{12+1}$ corresponds to $\overline{\lambda}_j$. The bit $\lambda_{w-1}$ is associated with the overall output wire of C.

At step 3., player $P_i$ gets w seeds $s^i_j$.

At step 4., player $P_i$ uses the strings $s^i_j$ as seeds of a pseudo random generator (PRG) for locally generating:

a. $f^i_j = F(s^i_j)$
b. $g^i_j = G(s^i_j)$
c. $h^i_j = H(s^i_j)$.

He commits to $f^i_j$, $g^i_j$, and $h^i_j$ and proves to the other players that he computed these values correctly. To do this, player $P_i$ commits to the Boolean values of the internal wires of circuit C. A verifier can now check whether these values are correct for all the gates.

At step 5., player $P_i$ secretly computes a. and b. below.

a. The garbled input for each wire $w_j$ $$\sigma_{w_j}^1 \| \ldots \| \sigma_{w_j}^n = s_{2j+(b_{wj} \oplus \lambda_j)}^1 \| \ldots \| s_{2j+(b_{wj} \oplus \lambda_j)}^n, \text{ such that}$$

$$|\sigma_{w_j}^1| = \ldots = |\sigma_{w_j}^n| = l.$$

That is, the garbled input of $P_i$ has one super seed per input wire.

b. The gate labels for each gate $g_j$ of C consisting of four strings. Assume $g_j$ computes some function $\circledast$ given the input on wires $w_a$ and $w_b$ while providing the output on wire $w_c$. Given: $\alpha = 2 \cdot a$; $\beta = 2 \cdot b$, and $\gamma = 2 \cdot c$, the four strings are defined as:

$$A_{g_j} = g_\alpha^1 \oplus \cdots \oplus g_\alpha^n \oplus g_\beta^1 \oplus \cdots \oplus g_\beta^n \oplus \begin{cases} s_\gamma^1 \| \cdots \| s_\gamma^n & \text{if } \lambda_a \odot \lambda_b = \lambda_c \\ s_{\gamma+1}^1 \| \cdots \| s_{\gamma+1}^n & \text{otherwise} \end{cases}$$

$$B_{g_j} = h_\alpha^1 \oplus \cdots \oplus h_\alpha^n \oplus g_{\beta+1}^1 \oplus$$
$$\cdots \oplus g_{\beta+1}^n \oplus \begin{cases} s_\gamma^1 \| \cdots \| s_\gamma^n & \text{if } \lambda_a \odot \overline{\lambda}_b = \lambda_c \\ s_{\gamma+1}^1 \| \cdots \| s_{\gamma+1}^n & \text{otherwise} \end{cases}$$

$$C_{g_j} = g_{\alpha+1}^1 \oplus \cdots \oplus g_{\alpha+1}^n \oplus h_\beta^1 \oplus \cdots \oplus h_\beta^n \oplus$$
$$\begin{cases} s_\gamma^1 \| \cdots \| s_\gamma^n & \text{if } \overline{\lambda}_a \odot \lambda_b = \lambda_c \\ s_{\gamma+1}^1 \| \cdots \| s_{\gamma+1}^n & \text{otherwise} \end{cases}$$

$$D_{g_j} = h_{\alpha+1}^1 \oplus \cdots \oplus h_{\alpha+1}^n \oplus h_{\beta+1}^1 \oplus \cdots \oplus h_{\beta+1}^n \oplus$$
$$\begin{cases} s_\gamma^1 \| \cdots \| s_\gamma^n & \text{if } \overline{\lambda}_a \odot \overline{\lambda}_b = \lambda_c \\ s_{\gamma+1}^1 \| \cdots \| s_{\gamma+1}^n & \text{otherwise} \end{cases}.$$

Phase 2 of the protocol involves evaluation of the garbled circuit. Specifically, at 6., each player $P_i$ publishes:

a. $\lambda_{w-}$=the bit that corresponds to the output wire;
b. $f^i_j$=the wire labels of wire $w_j$;
c. $A_{g_j}$, $B_{g_j}$, $C_{g_j}$, and $D_{g_j}$=the gate labels of gate $g_j$;
d. $\sigma_{w_j}^1 \| \ldots \| \sigma_{w_j}^n$=the garbled input corresponding to wire $w_j$.

Steps a. to c. carry the information required for constructing the garbled circuit, while step d. reveals the garbled input.

At step 7., player $P_i$ evaluates C locally as follows. He has for each input wire $w_j$ a super seed:

$$\begin{cases} s_{2j}^1 \| \cdots \| s_{2j}^n = \sigma_j^1 \| \cdots \| \sigma_j^n & \text{if } F(\sigma_j^1) = f_{2j}^1 \\ s_{2j+1}^1 \| \cdots \| s_{2j+1}^n = \sigma_j^1 \| \cdots \| \sigma_j^n & \text{otherwise} \end{cases}.$$

For each gate $g_j$, he has $s_{\alpha+p}^1 \| \ldots \| s_{\alpha+p}^n$ for input wire $w_a$ and $s_{\beta+q}^1 \| \ldots \| \mu s_{\beta+q}^n$ for input wire $w_b$, where $p, q \in \{0, 1\}$ and $\alpha$ and $\beta$ are even.

a. For output wire $w_c$ of gate $g_j$, the player sets:

$$g_{\alpha+p}^i = G(s_{\alpha+p}^i)$$

$$h_{\alpha+p}^i = H(s_{\alpha+p}^i)$$

$$g_{\beta+p}^i = G(s_{\beta+p}^i)$$

$$h_{\beta+p}^i = H(s_{\beta+p}^i)$$

b. For output wire $w_c$ of gate $g_j$, the player computes:

$$\sigma_c \begin{cases} g_{\alpha+p}^1 \oplus \cdots \oplus g_{\alpha+p}^n \oplus g_{\beta+q}^1 \oplus \cdots \oplus g_{\beta+q}^n \oplus A_{g_j} & \text{if } p = 0 \text{ and } q = 0 \\ h_{\alpha+p}^1 \oplus \cdots \oplus h_{\alpha+p}^n \oplus g_{\beta+q}^1 \oplus \cdots \oplus g_{\beta+q}^n \oplus B_{g_j} & \text{if } p = 0 \text{ and } q = 1 \\ g_{\alpha+p}^1 \oplus \cdots \oplus g_{\alpha+p}^n \oplus h_{\beta+q}^1 \oplus \cdots \oplus h_{\beta+q}^n \oplus C_{g_j} & \text{if } p = 1 \text{ and } q = 0 \\ h_{\alpha+p}^1 \oplus \cdots \oplus h_{\alpha+p}^n \oplus h_{\beta+q}^1 \oplus \cdots \oplus h_{\beta+q}^n \oplus D_{g_j} & \text{if } p = 1 \text{ and } q = 1 \end{cases}.$$

Now, $P_i$ has $s_{2c}^1 \| \ldots \| s_{2c}^n = \sigma_c$ if $F(\sigma_c^1) = f_{2c}^1$, and otherwise has $s_{2c+1}^1 \| \ldots \| s_{2c+1}^n = \sigma_c$.

As soon as $P_i$ has successfully computed $s_{2w+p}^1 \| \ldots \| s_{2w+p}^n$ (that is, he has evaluated every gate), the overall result of the garbled circuit is $p \oplus \lambda_{w-1}$.

This alternative approach utilizing garbled circuits may call for the input to be an integer. As this protocol implements the generic approach of garbled circuits, it can be used for calculating any computable function.

In order to compute the desired statistical measures, a circuit is created that implements the corresponding mathematical functions. Even though this has to be done only once, it requires up-front effort. Independent of the function being evaluated, this approach guarantees input privacy, i.e. confidentiality, against semi-honest adversaries.

Such embodiments utilizing garbled circuits approaches could be enhanced to provide security against malicious attackers. Each player provides proof that he did his local computations of phase 1 correctly. As each player evaluates the circuit locally without any further interaction, integrity of the output based on the provably correct circuit is trivial.

Communication between the players while maintaining anonymity could be implemented by a mediating server.

Still another possible alternative approach according to embodiments, utilizes linear secret sharing and homomorphic encryption. Such an approach shares every player $P_i$'s secret input value $x_i$ among the set of n players using a linear secret sharing scheme.

In particular, each player $P_j$ holds one share $[[x_i]]_j$ for each of the n secret-shared values $[[x_i]]$. Using a linear secret sharing scheme implies that any linear operation applied to the shares yields a share of the result of that operation.

Furthermore, an n-out-of-n threshold scheme should be selected. This guarantees that no subset of players $\mathcal{P}' \subset \mathcal{P}$ with $\mathcal{P} \notin \mathcal{P}'$ is able to reconstruct the secret-shared value $[[x_i]]$.

The additive secret sharing scheme is such a linear n-out-of-n threshold scheme. The first n−1 shares $[[x_i]]_1$, $[[x_i]]_{n-1}$ in that scheme are uniformly chosen random values.

According to $$[x]_n = x - \sum_{i=1}^{n-1} [x]_j,$$

the n-th share is $$[x_i]_n = x_j - \sum_{j=1}^{n-1} [x_i]_j.$$

Many possible functions f(x) can be computed only by using addition and multiplication. Addition of shares is based on the linear property of the secret sharing scheme that allows the players to add their shares locally to obtain a share of the sum.

Publishing and adding these shares yields the sum. For n players $P_i$ with secret-shared values $[[x_j]] = \sum_{j=1}^{n} [x_j]_i$ the local calculation of player $P_i$'s share of the sum $y = \sum_{j=1}^{n} x_j$ can be formalized as follows.

$$[y]_i = \sum_{j=1}^{n} [x_j]_i$$

Multiplication is not a linear operation. Therefore, it cannot be computed locally.

One possible multiplication subprotocol is based on the combination of linear secret sharing and a homomorphic encryption scheme with additive homomorphic property.

Given E(.), a (randomized) encryption function of an asymmetric cryptosystem, and D(.), the corresponding decryption function, it holds that $E(x_1)^{x_2} = E(x_1 \cdot x_2)$. For two players $P_1$ and $P_2$ with secret-shared values $[[x_i]] = [[x_i]]_1 + [[x_i]]_2$, the product $y = x_1 \cdot x_2$ has the form:

$$y = [[y]]_1 + [[y]]_2$$
$$= [[x_1]] \cdot [[x_2]] = ([[x_1]]_1 + [[x_1]]_2) \cdot ([[x_2]]_1 + [[x_2]]_2)$$
$$= [[x_1]]_1 \cdot [[x_2]]_2 + [[x_1]]_1 \cdot [[x_2]]_2 + [[x_1]]_1 \cdot [[x_2]]_1 + [[x_1]]_2 \cdot [[x_2]]_2.$$

Based on this, the multiplication subprotocol comprises the following steps.

1. Each player $P_i$ can compute one summand locally as: $v_i = [[x_1]]_i \cdot [[x_2]]_i$.
2. Player $P_1$ has E(.) and D(.) as he knows both the encryption and the decryption key. He encrypts his shares and sends the ciphertexts $E([[x_1]]_1)$ and $E([[x_2]]_1)$ to $P_2$.
3. Player $P_2$ has E(.) but not D(.) as he does not know the secret decryption key.
   a. He selects a random value r.
   b. He computes and sends:

$$w = E([x_1]_1)^{[x_2]_2} \cdot E([x_2]_1)^{[x_1]_2} \cdot E(-r)$$
$$= E([x_1]_1 \cdot [x_2]_2 + [x_1]_2 \cdot [x_2]_1 - r).$$

4. The players compute their shares of the product.
   a. Player $P_1$ computes:

$$[[y]]_1 = D(w) + v_1$$
$$= [[x_1]]_1 \cdot [[x_2]]_2 + [[x_1]]_2 \cdot [[x_2]]_1 - r + [[x_1]]_1 \cdot [[x_2]]_1.$$

b. Player $P_2$ computes:

$$[[y]]_2 = r + v_2$$
$$= r + [[x_1]]_2 \cdot [[x_2]]_2.$$

The sum of the two product shares computed in this step 4 equals:

$$y = [[y]]_1 + [[y]]_2$$
$$= [[x_1]]_1 \cdot [[x_2]]_2 + [[x_1]]_2 \cdot [[x_2]]_1 - r +$$
$$\quad [[x_1]]_1 \cdot [[x_2]]_1 + r + [[x_1]]_2 \cdot [[x_2]]_2$$
$$= [[x_1]]_1 \cdot [[x_2]]_2 + [[x_1]]_2 \cdot [[x_2]]_1 +$$
$$\quad [[x_1]]_1 \cdot [[x_2]]_1 + [[x_1]]_2 \cdot [[x_2]]_2$$
$$= x_1 \cdot x_2.$$

This subprotocol can be enhanced to the multi-party scenario as well. The number of summands increases exponentially in n.

One way to reduce the complexity is to split the product into subproducts of at most two factors, run the multiplication subprotocol for each of these subproducts, and repeat this process for each result until there is only one factor left. This causes the round complexity to grow linearly with the number of factors in the product.

This secret sharing approach offers a set of subprotocols for addition and multiplication. Secure channels could be implemented utilizing a mediating server. The pairwise communication, especially the share distribution, could be mediated by a central server to preserve anonymity.

In this approach, a player's secret input can be either an integer or a real number. Also, as this approach is a combination of the generic approaches of secret sharing and homomorphic encryption, it can be utilized for calculating any computable function.

To be able to compute the desired statistical measures, a circuit C implementing the corresponding mathematical functions is to be created. Even though this has to be done only once in advance, this additional step requires up-front effort.

Furthermore, privacy of the players' inputs is guaranteed against semi-honest adversaries. For that reason, the approach ensures confidentiality.

Still another possible alternative approach utilizes Fully Homomorphic Encryption (FHE). In contrast to semi-homomorphic encryption schemes (which are either additively or multiplicatively homomorphic), fully homomorphic encryption schemes allow both addition and multiplication of encrypted values without the necessity of decryption.

Therefore, an advantage of such an FHE scheme is that it can be used for computing arbitrary functions based on encrypted data without having the decryption key. More formally, given a FHE scheme with an encryption function $E(.)$ and the encrypted secret values $E(x_1), \ldots, E(x_n)$, one can compute the encrypted result $E(y)=E(f(x_1, \ldots, x_n))$ for any efficiently computable function $f(x)$ without using the corresponding decryption function $D(.)$.

No information is leaked since the secret values, intermediate results, and the overall result are encrypted at any time.

In the event that such information is provided, one can build a secure MPC system where one player conducts the entire computation of $E(f(x))$ locally without learning anything about the secret inputs of the players or about the result. Therefore, even a distrusted third party can be assigned the task of computing $E(f(x))$.

A FHE scheme may be based on hard problems on ideal lattices. Given is a basis $B=(b1, \ldots, b_m) \in R^n$, i.e. an m-tuple of n-dimensional, linearly independent vectors in the Euclidean vector space $R^n$ (here, n is not related to the number of participants involved in the secure MPC protocol). The vectors $b_i$ are called basis vectors.

A lattice:

$$L = \langle b_1, \ldots, b_m \rangle_{\mathbb{Z}} = \left\{ \sum_{i=1}^{m} a_i \cdot b_i \mid a_i \in \mathbb{Z} \right\}$$

is the set that contains any possible n-dimensional vector that is a linear combination of the basis vectors bi using only integer coefficients $a_i$. The elements of a lattice are referred to as lattice points. A matrix G is called generator matrix of the lattice L in case its rows are the row vectors of the basis B.

As an example, FIG. 11 shows the lattice defined by the example generator matrix:

$$G_e = \begin{pmatrix} 1 & 0.25 \\ 0 & -0.75 \end{pmatrix}$$

Lattices in general have an additive structure providing the additive homomorphic property. To also obtain the multiplicative homomorphic property, embodiments may use ideal lattices.

These are lattices based on ideals, i.e. special subsets of rings. A ring is an algebraic structure that is closed under addition and multiplication. Ideals are special subsets of rings.

Since rings are closed under addition and multiplication, encryption using ideal lattices provides both the additive and the multiplicative homomorphic property.

The performance of addition and multiplication under a FHE scheme involves first constructing a somewhat homomorphic encryption (SWHE) scheme based on ideal lattices. The SWHE is later turned into a FHE scheme.

A SWHE scheme can be constructed as follows. The public key of the scheme describes an ideal lattice L while the secret key is a matrix $S \in Q^{m \times m}$.

The encryption of a secret message $x \in Z_p$ for some prime number p yields the ciphertext: $y=v+e$, where v is a vector in L and $e \equiv m \pmod{p}$ is a noise vector.

The secret value x can be recovered by computing: $x \leftarrow y-[y \cdot S] \bmod p$ where $[.]$ denotes rounding to the nearest integer.

To compute the encrypted sum of two plaintexts $x_1$ and $x_2$ given only the corresponding ciphertexts $E(x_1)$ and $E(x_2)$, one simply adds these ciphertexts as depicted:

$$D(E(x_1+x_2))=x_1+x_2.$$

The same applies to the computation of the encrypted product of $x_1$ and $x_2$:

$$D(E(x_1 \cdot x_2))=x_1 \cdot x_2$$

However, adding or multiplying ciphertexts also includes adding or multiplying the noise vectors. Therefore, the overall noise vector increases during addition and multiplication.

Too large of a noise vector can eventually cause a decryption error. Thus, such a scheme is referred to as somewhat homomorphic.

To convert a SWHE scheme into a FHE scheme, the decryption circuit of the SWHE scheme is reduced until the circuit can be evaluated by the SWHE scheme itself. This can be achieved by adding a hint about the secret decryption key to the public key.

The hint can be used to process a ciphertext $E(y)$, i.e. compute another ciphertext $E'(y) \neq E(y)$. However, the hint cannot be used for decrypting $E(y)$.

The evaluation of the decryption circuit can be used to refresh the encrypted result (i.e., reduce its noise), which prevents the noise vector from causing a decryption error. Eventually, this yields a FHE scheme.

This alternative approach describes a fully homomorphic encryption scheme and how it can be used for secure MPC. Secure channels can be implemented utilizing a mediating server.

As FHE implements the generic approaches of homomorphic encryption, it can be used for calculating any computable function.

For computing the desired statistical measures, a circuit C implementing the corresponding mathematical functions can be created. Even though this has to be done only once in advance, the additional step of creating the circuit requires up-front effort.

The fully homomorphic encryption scheme provides input privacy against semi-honest adversaries. Furthermore, embodiments may make a system secure even against malicious attackers, increasing the communication complexity polynomially.

A benefit of fully homomorphic encryption is that any computable function can be calculated based only on the encrypted inputs. Thus a central server can evaluate the circuit C. Therefore, this approach suits the central server model and allows anonymity among the players.

Reducing the decryption circuit and allowing refreshing of the encrypted results is complex, since each bit of the secret key has to be replaced by its ciphertext to create the hint. In various embodiments, the computation overhead per gate may be polynomial or quasilinear in the security parameter. The computation overhead may be polynomial in the depth of the circuit.

Some embodiments may be implemented in connection with an in-memory database, with the in-memory database engine responsible for performing one or more actions implementing privacy-preserving benchmarking utilizing secure computation.

Figure 12:
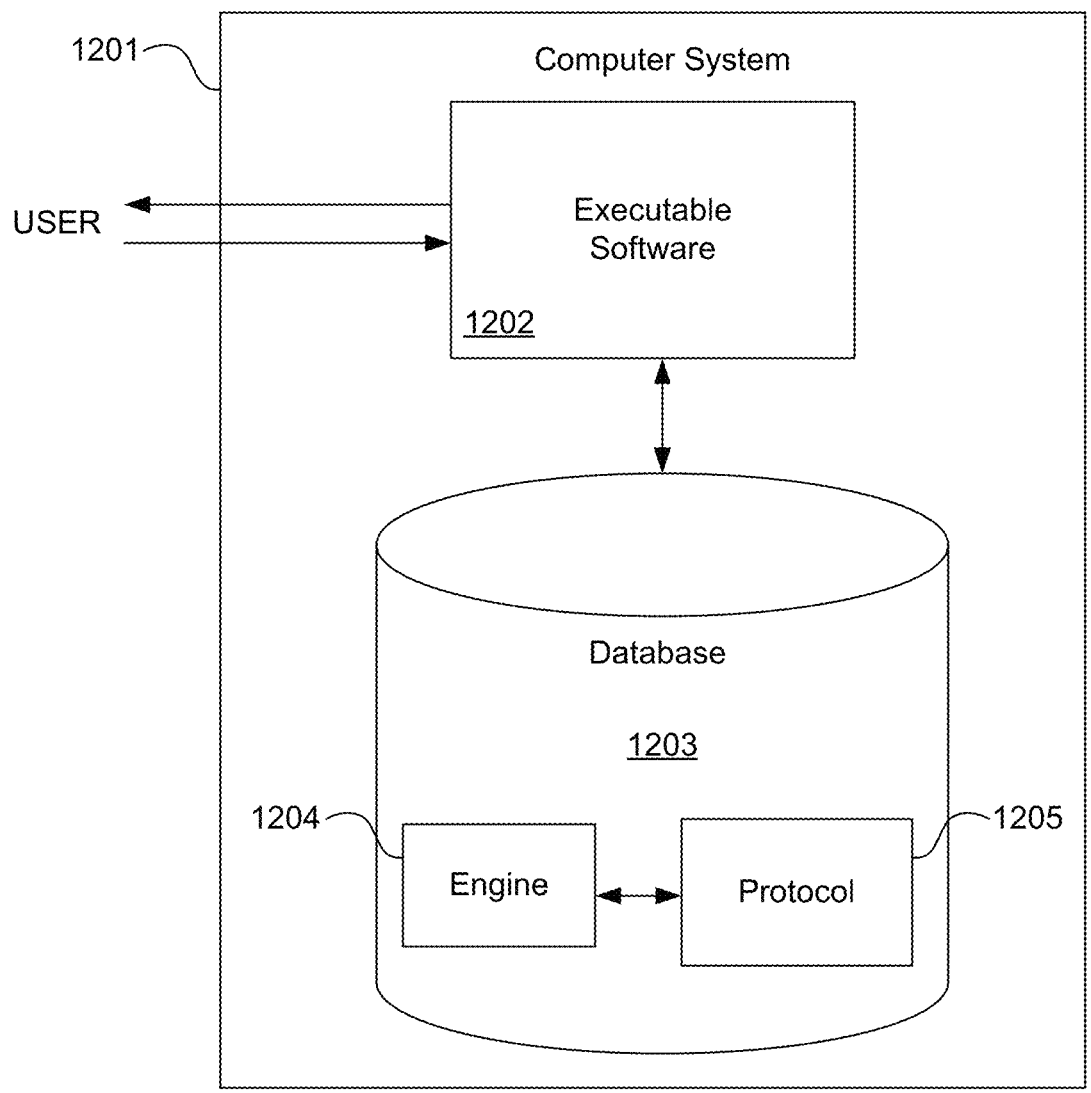
FIG. 12 illustrates hardware of a special purpose computing machine according to an embodiment that is configured to implement privacy-preserving benchmarking.

FIG. 12 illustrates hardware of a special purpose computing machine configured to implement privacy-preserving benchmarking according to an embodiment. In particular, computer system 1201 comprises a processor 1202 that is in electronic communication with a non-transitory computer-readable storage medium comprising a database 1203. This computer-readable storage medium has stored thereon code 1205 corresponding to a protocol. Code 1204 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 13:
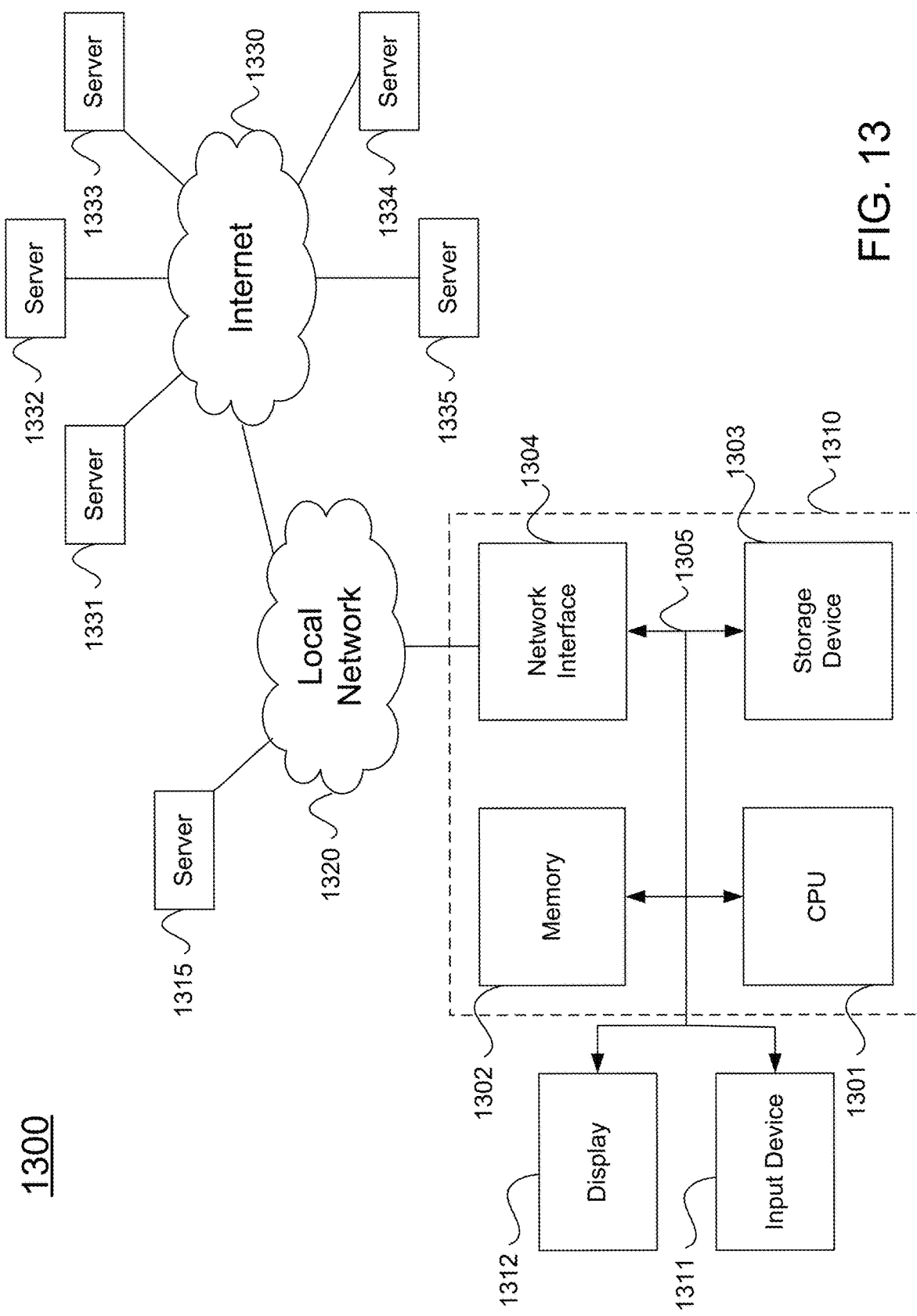
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1805. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
a central service provider receiving from a first player, an encrypted first value of a key figure type;
the central service provider receiving from a second player, an encrypted second value of the key figure type;
the central service provider receiving from a third player, an encrypted third value of the key figure type, wherein the first player, the second player, and the third player comprise a peer group;
the central service provider performing a secure multi-party computation protocol with the peer group using the encrypted first value, the encrypted second value, and the encrypted third value to generate a statistical measure selected from a top quartile and a bottom quartile, the secure multi-party computation protocol including a determination of ranks of the encrypted first value, the encrypted second value, and the encrypted third value in a sorted list and a selection of a bottom quartile value of the sorted list or a top quartile value of the sorted list using an oblivious transfer protocol;
the central service provider storing the statistical measure in a database as a data object comprising the key figure type and the peer group; and
the central service provider communicating the statistical measure to the first player, the second player, and the third player, the statistical measures indicating whether the first, second, and third values of the key figure type respectively place each of the first, second, and third players in the top or bottom quartile within the peer group.

2. A method as in claim 1 wherein the secure computation protocol comprises a semi-homomorphic encryption scheme exhibiting an additive homomorphic property.

3. A method as in claim 2 wherein the semi-homomorphic encryption scheme comprises Paillier's encryption.

4. A method as in claim 2 wherein the central service provider communicates with the first player through an oblivious transfer.

5. A method as in claim 2 wherein the central service provider communicates a hashed Message Authentication Code (MAC) to the first player.

6. A method as in claim 1 wherein the secure computation protocol is performed utilizing a circuit of the central service provider.

7. A method as in claim 6 wherein the secure computation protocol utilizes garbled circuits.

8. A method as in claim 6 wherein the secure computation protocol utilizes secret sharing.

9. A method as in claim 6 wherein the secure computation protocol utilizes fully homomorphic encryption.

10. A method as in claim 1 wherein:
the database comprises an in-memory database; and
the central service provider comprises an in-memory database engine.

11. A non-transitory computer readable storage medium embodying a computer program for performing a method, said method comprising:
a central service provider receiving from a first player, an encrypted first value of a key figure type;
the central service provider receiving from a second player, an encrypted second value of the key figure type;
the central service provider receiving from a third player, an encrypted third value of the key figure type, wherein the first player, the second player, and the third player comprise a peer group;
the central service provider performing a secure computation protocol with the peer group using the encrypted first value, the encrypted second value, and the encrypted third value to generate a statistical measure selected from a top quartile and a bottom quartile, wherein the secure computation protocol is based upon a semi-homomorphic encryption scheme exhibiting an additive homomorphic property, a determination of ranks of the encrypted first value, the encrypted second value, and the encrypted third value in a sorted list, and a selection of a bottom quartile value of the sorted list or a top quartile value of the sorted list using an oblivious transfer protocol;
the central service provider storing the statistical measure in a database as a data object comprising the key figure type and the peer group; and
the central service provider communicating the statistical measure to the first player, the second player, and the third player, the statistical measures indicating whether the first, second, and third values of the key figure type respectively place each of the first, second, and third players in the top or bottom quartile within the peer group.

12. A non-transitory computer readable storage medium as in claim 11 wherein the semi-homomorphic encryption scheme comprises Paillier's encryption.

13. A non-transitory computer readable storage medium as in claim 11 wherein the central service provider communicates with the first player through an oblivious transfer.

14. A non-transitory computer readable storage medium as in claim 11 wherein the central service provider communicates a hashed Message Authentication Code (MAC) to the first player.

15. A non-transitory computer readable storage medium as in claim 11 wherein:
the database comprises an in-memory database; and
the central service provider comprises an in-memory database engine.

16. A computer system comprising:
one or more processors; and
a non-transitory computer readable storage medium coupled to the one or more processors and having stored thereon a software program executable by the one or more processors to:
receive from a first player, an encrypted first value of a key figure type;
receive from a second player, an encrypted second value of the key figure type;
receive from a third player, an encrypted third value of the key figure type, the first player, the second player, and the third player comprising a peer group;
perform a secure computation protocol with the peer group using the encrypted first value, the encrypted second value, and the encrypted third value to generate a statistical measure selected from a top quartile and a bottom quartile, the secure multi-party computation protocol including a determination of ranks of the encrypted first value, the encrypted second value, and the encrypted third value in a sorted list and a selection of a bottom quartile value of the sorted list or a top quartile value of the sorted list using an oblivious transfer protocol;
store the statistical measure in an in-memory database as a data object comprising the key figure type and the peer group; and
communicate the statistical measure to the first player, the second player, and the third player, the statistical measures indicating whether the first, second, and third values of the key figure type respectively place each of the first, second, and third players in the top or bottom quartile within the peer group.

17. A computer system as in claim 16 wherein the secure computation protocol comprises a semi-homomorphic encryption scheme exhibiting an additive homomorphic property.

18. A computer system as in claim 17 wherein the remote in-memory database engine communicates a hashed Message Authentication Code (MAC) to the first player.

19. A computer system as in claim 16 wherein the in-memory database engine performs the secure computation protocol utilizing a circuit.

20. A computer system as in claim 19 wherein the secure computation protocol comprises garbled circuits, secret sharing, or fully homomorphic encryption.

* * * * *